United States Patent
Aoki et al.

(10) Patent No.: US 11,921,939 B2
(45) Date of Patent: Mar. 5, 2024

(54) INFORMATION PROCESSING SYSTEM, CONTROLLER, INFORMATION PROCESSING METHOD, AND COMPUTER-READABLE NON-TRANSITORY STORAGE MEDIUM HAVING STORED THEREIN INFORMATION PROCESSING PROGRAM

(71) Applicant: NINTENDO CO., LTD., Kyoto (JP)

(72) Inventors: Takafumi Aoki, Kyoto (JP); Takanori Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 18/316,068

(22) Filed: May 11, 2023

(65) Prior Publication Data
US 2023/0280850 A1    Sep. 7, 2023

Related U.S. Application Data

(63) Continuation of application No. PCT/JP2020/043070, filed on Nov. 18, 2020.

(51) Int. Cl.
*G06F 3/038*      (2013.01)
*G05G 9/047*      (2006.01)
(Continued)

(52) U.S. Cl.
CPC .............. *G06F 3/038* (2013.01); *G05G 9/047* (2013.01); *G06F 3/016* (2013.01); *G06F 3/0338* (2013.01); *G05G 2009/04766* (2013.01)

(58) Field of Classification Search
None
See application file for complete search history.

(56) References Cited

U.S. PATENT DOCUMENTS

2016/0361641 A1   12/2016  Koizumi et al.
2020/0257369 A1*   8/2020  Battlogg ................ B60K 37/06
(Continued)

FOREIGN PATENT DOCUMENTS

JP    2014174726 A  *  9/2014
JP    2014174726 A      9/2014
(Continued)

OTHER PUBLICATIONS

International Search Report for PCT/JP2020/043070 dated Feb. 9, 2021, 5 pages, including English translation.
(Continued)

*Primary Examiner* — Dorothy Harris
(74) *Attorney, Agent, or Firm* — Nixon & Vanderhye PC

(57) ABSTRACT

This information processing system includes: a controller including an operation element to be displaced from an initial position by user's operation, a restoring force imparting section applying a restoring force for returning the displaced operation element to the initial position, a resistance section using a magnetorheological fluid whose viscosity changes with a magnetic-field intensity and which becomes resistance when the operation element is displaced from/to the initial position, and a magnetic field generation section which provides the magnetic field to the magnetorheological fluid; and a circuit capable of controlling the magnetic field generation section. The circuit controls a magnetic-field intensity so that the viscosity of the magnetorheological fluid periodically changes at least between a first viscosity state and a second viscosity state in which the viscosity is lower than in the first viscosity state so that the operation element returns to the initial position by the restoring force.

22 Claims, 17 Drawing Sheets

(51) Int. Cl.
    *G06F 3/01*         (2006.01)
    *G06F 3/0338*     (2013.01)

(56) References Cited

U.S. PATENT DOCUMENTS

| | | | | |
|---|---|---|---|---|
| 2020/0272193 | A1* | 8/2020 | Battlogg | G05G 5/03 |
| 2021/0286431 | A1* | 9/2021 | Eck | G05G 5/03 |
| 2023/0280848 | A1* | 9/2023 | Aoki | G05G 9/047 |
| | | | | 345/161 |
| 2023/0280849 | A1* | 9/2023 | Aoki | G05G 9/047 |
| | | | | 345/161 |

FOREIGN PATENT DOCUMENTS

| | | | |
|---|---|---|---|
| JP | 2017004523 | A | 1/2017 |
| JP | 2017111464 | A | 6/2017 |
| JP | 2017167603 | A | 9/2017 |
| JP | 2020035376 | A | 3/2020 |

OTHER PUBLICATIONS

Written Opinion of the ISA for PCT/JP2020/043070 dated Feb. 9, 2021, 4 pages.

\* cited by examiner

F I G. 2
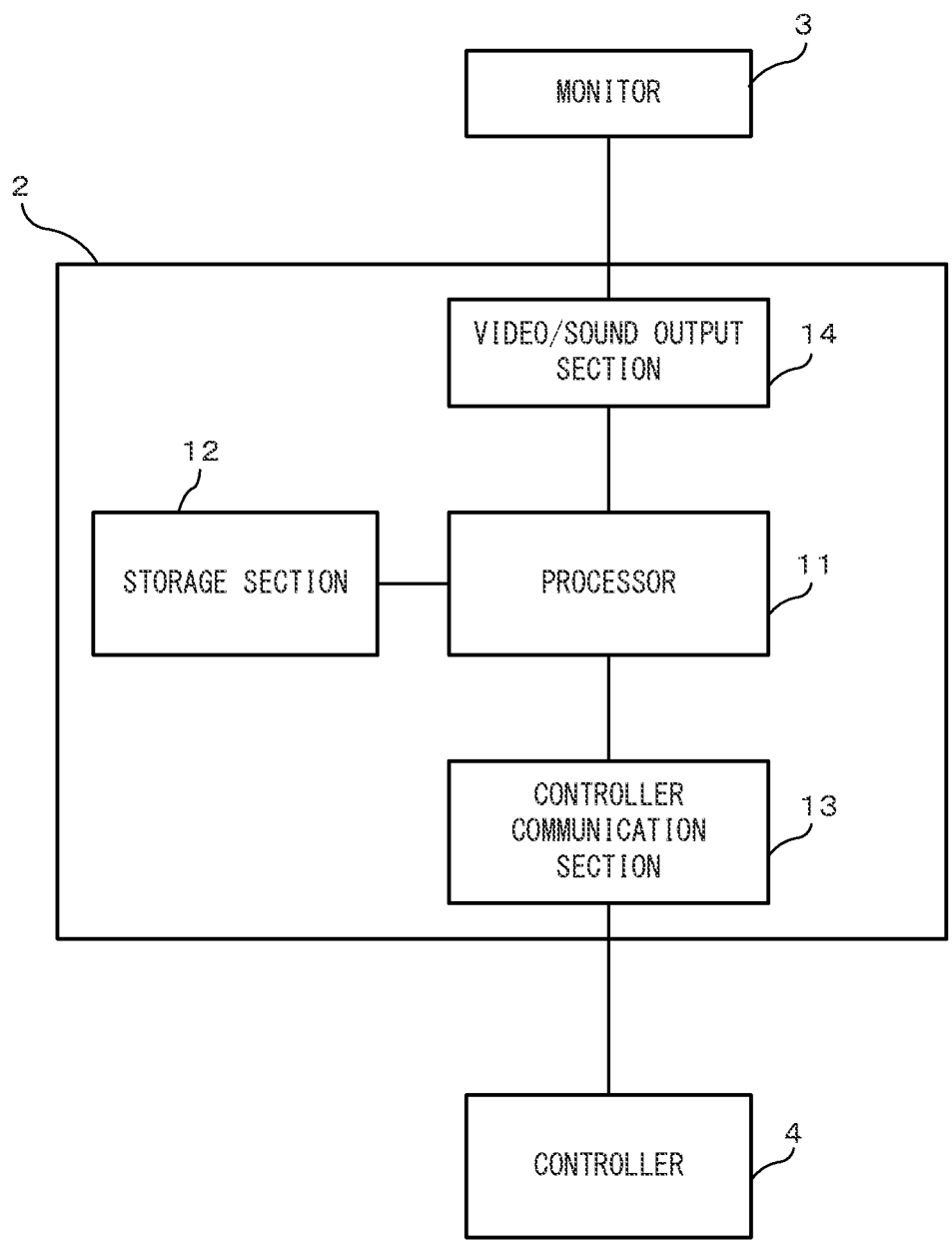

INFORMATION PROCESSING SYSTEM, CONTROLLER, INFORMATION PROCESSING METHOD, AND COMPUTER-READABLE NON-TRANSITORY STORAGE MEDIUM HAVING STORED THEREIN INFORMATION PROCESSING PROGRAM

CROSS REFERENCE TO RELATED APPLICATION

This application is a continuation of International Application No. PCT/JP2020/043070 filed on Nov. 18, 2020, the entire contents of which are incorporated herein by reference.

FIELD

The present disclosure relates to an information processing system including at least a controller having an operation element such as a button or a stick, a controller, an information processing method, and a computer-readable non-transitory storage medium having stored therein an information processing program.

BACKGROUND AND SUMMARY

Conventionally, there has been known a controller including an operation element such as a button or a stick.

In such a controller, there has been room for improvement in terms of enhancement of a feeling and an information amount that a user receives when operating an operation element.

Accordingly, an object of the present disclosure is to provide an information processing system, a controller, an information processing method, and a computer-readable non-transitory storage medium having stored therein an information processing program, that can enhance a feeling and an information amount that a user receives when operating an operation element.

The above object is achieved by the following configurations, for example.

One configuration example is an information processing system including: a controller including an operation element configured to be displaced from an initial position by a user's operation, a restoring force imparting section configured to apply a restoring force for returning a position of the displaced operation element to the initial position, a resistance section using a magnetorheological fluid whose viscosity changes in accordance with an intensity of a magnetic field and which serves as a resistance when the operation element is displaced from the initial position and to the initial position, and a magnetic field generation section configured to provide the magnetic field to the magnetorheological fluid; and a circuit capable of controlling the magnetic field generation section. The circuit is configured to control the intensity of the magnetic field generated by the magnetic field generation section so that the viscosity of the magnetorheological fluid periodically changes at least between a first viscosity state and a second viscosity state in which the viscosity is lower than in the first viscosity state and has such a value that the operation element returns to the initial position by the restoring force.

According to the above configuration example, since not only the first viscosity state having a high viscosity but also the second viscosity state having a low viscosity is provided, it is possible to make restoration to the initial position faster while letting the user feel a viscosity in movement of the operation element. Here, by increasing the viscosity (resistance force) of the magnetorheological fluid, it is possible to let the user feel a greater viscosity, but if the viscosity becomes greater than the restoring force of the operation element, the operation element might not autonomously return to the initial position. In this regard, for example, even if the viscosity having a great resistance force as described above is set for the first viscosity state, in this configuration example, the second viscosity state in which the restoring force can be exerted is provided, whereby the operation element can be autonomously restored to the initial position.

In another configuration example, the circuit may perform control so that a period of the second viscosity state is a first predetermined period or longer, in each cycle.

Even in a case where the restoring force in the second viscosity state is greater than the resistance force of the magnetorheological fluid, if the period of the second viscosity state is extremely short, the second viscosity state soon switches to the first viscosity state, so that displacement toward the initial position might not substantially start. In this regard, according to the above configuration example, the second viscosity state is provided over a predetermined period or longer, whereby a period for returning to the initial position is ensured and an operation of the operation element to autonomously return to the initial position can be more likely to be realized.

In still another configuration example, the circuit may perform control so that a period of the second viscosity state is longer than a period of the first viscosity state, in each cycle.

According to the above configuration example, a period for the operation element to return to the initial position is ensured to be longer, whereby an operation of the operation element to autonomously return to the initial position can be more likely to be realized.

In still another configuration example, in the first viscosity state, the viscosity may have such a value that the operation element does not return to the initial position by the restoring force by the restoring force imparting means.

According to the above configuration example, a period in which the operation element does not autonomously return to the initial position can be provided. Then, by changing the viscosity periodically between the first viscosity state and the second viscosity state, it is possible to provide the user with an unprecedented feeling on the operation element and an unprecedented operation feeling thereof, while ensuring movement of the operation element autonomously returning to the initial position.

In still another configuration example, the information processing system may further include an information processing apparatus. Then, the circuit may be provided at least in the controller, and may control the intensity of the magnetic field generated by the magnetic field generation section, on the basis of designation from a predetermined application executed in the information processing apparatus.

According to the above configuration example, the intensity of the magnetic field can be designated from the application. Thus, it is possible to perform flexible control in accordance with the application. In addition, the circuit for performing control is provided in the controller. Here, the processing cycle in the controller is generally shorter than the processing execution cycle in the application. It is possible to use a combination of flexible control based on designation from the application and higher-response control performed as processing in the controller.

In still another configuration example, viscosity information for realizing the first viscosity state and the second viscosity state may be stored as a preset in a predetermined storage section in advance. Then, in accordance with designation of the preset from a predetermined application executed in the information processing system, the circuit may control the intensity of the magnetic field on the basis of the viscosity information corresponding to the designated preset.

According to the above configuration example, it is possible to reduce the burden on the developer in development. For example, in a case where a developer sets or designs parameters for control for the operation element to return to the initial position at each time when an application is developed, the burden of the development is likely to increase. Therefore, if such parameters are provided as presets in advance and the developer or the like uses the presets, it is possible to easily develop the application or the like.

In still another configuration example, the controller may include a library storage section storing a preset library including at least one said preset. Then, the circuit may cause the controller to acquire the viscosity information from the preset library on the basis of designation of the preset from the predetermined application executed in the information processing apparatus, and to control the intensity of the magnetic field on the basis of the acquired viscosity information.

In still another configuration example, the circuit may cause the controller to acquire the viscosity information from the preset library on the basis of designation of the preset from the predetermined application and position information indicating a position of the operation element, and to control the intensity of the magnetic field on the basis of the acquired viscosity information.

According to the above configuration example, it is possible to perform principal viscosity control inside only the controller. Therefore, in view of difference between the operation speed of the application and the operation speed inside the controller, it is possible to obtain higher response than in a case of designating the viscosity directly from the application. Thus, for example, in a case of performing control of changing the viscosity in accordance with the position of the operation element, faster change of the viscosity can be achieved, whereby varieties of expressions for presenting feelings can be increased.

In still another configuration example, the circuit may acquire information of the position of the operation element and/or a change speed of the position, correct the viscosity information acquired from the preset library, in accordance with the information, and control the intensity of the magnetic field on the basis of the corrected viscosity information.

In still another configuration example, the circuit may be provided to the controller.

According to the above configuration example, control for the magnetic field generation section can be realized as processing in the controller. Thus, it is possible to achieve control having high response.

In still another configuration example, the circuit may continue to control the intensity of the magnetic field on the basis of the viscosity information corresponding to the preset designated last, even when there is no designation from the predetermined application.

According to the above configuration example, once designation is performed from the application, it is possible to continue control for the intensity of the magnetic field by the controller alone, even if subsequent designation is not successively performed.

In still another configuration example, the circuit may be capable of switching control between first viscosity control which is viscosity control based on an application state but not based on a position of the operation element, and second viscosity control which is viscosity control based on the position of the operation element.

In still another configuration example, in a case of performing the first viscosity control, the circuit may control the intensity of the magnetic field on the basis of the viscosity information outputted from the predetermined application. Further, in a case of performing the second viscosity control, the circuit may cause the controller to acquire the viscosity information from the preset library on the basis of designation of the preset from the predetermined application and position information indicating the position of the operation element, and to control the intensity of the magnetic field on the basis of the acquired viscosity information.

According to the above configuration example, it is possible to selectively use a more appropriate control manner in accordance with whether to perform viscosity control based on the position of the operation element or viscosity control irrelevant to the position of the operation element.

In still another configuration example, the circuit may acquire viscosity designation information outputted from the predetermined application and designating a state of the viscosity of the magnetorheological fluid. Further, the circuit may generate viscosity information for realizing the first viscosity state or the second viscosity state, on the basis of the viscosity designation information, and control the intensity of the magnetic field on the basis of the generated viscosity information.

According to the above configuration example, by designating the viscosity state from the application, information for realizing the first viscosity state or the second viscosity state is generated, and also, viscosity control is performed on the basis of the generated information. Thus, it is possible to increase varieties of expressions for presenting feelings as compared to a case of using only presets prepared in advance, while reducing the development burden on the application developer to a certain extent.

In still another configuration example, the information processing system may further include restoring force parameter acquisition means configured to acquire a restoring force parameter which is a parameter relevant to the restoring force. Then, the circuit may adjust viscosity information for realizing the first viscosity state and/or viscosity information for realizing the second viscosity state, in accordance with the acquired restoring force parameter, or control a period of the first viscosity state and/or a period the second viscosity state in accordance with the restoring force parameter.

According to the above configuration example, viscosity can be adjusted and controlled using the restoring force parameter. Thus, it is possible to perform appropriate viscosity control in accordance with the individual difference, performance, and the like of the restoring force of each controller.

In still another configuration example, the circuit may execute at least one of (1) control of making the viscosity in the first viscosity state lower when the restoring force is small than when the restoring force is great, (2) control of making a period of the first viscosity state shorter when the restoring force is small than when the restoring force is great, (3) control of making the viscosity in the second viscosity state lower when the restoring force is small than when the restoring force is great, and (4) control of making a period of the second viscosity state longer when the restoring force is small than when the restoring force is great.

According to the above configuration example, it is possible to set an appropriate viscosity in accordance with the individual difference, performance, and the like of the restoring force of each controller.

In still another configuration example, the restoring force by the restoring force imparting section may be such that, as displacement of the operation element becomes greater, the restoring force for returning to the initial position becomes greater. In addition, the information processing system may further include an operation position acquisition section configured to acquire a position of the operation element. Then, in accordance with the position of the operation element acquired by the operation position acquisition section, the circuit may adjust viscosity information for realizing the first viscosity state and/or viscosity information for realizing the second viscosity state or control a period of the first viscosity state and/or a period of the second viscosity state.

In still another configuration example, (I) in a case where the position of the operation element acquired by the operation position acquisition section is displaced so as to return to the initial position, the circuit may perform adjustment such that, as displacement of the operation element becomes greater, the viscosity in the first viscosity state and/or the second viscosity state becomes greater, and (II) in a case where the position of the operation element is displaced so as to move away from the initial position, the circuit may perform adjustment such that, as displacement of the operation element becomes greater, the viscosity in the first viscosity state and/or the second viscosity state becomes smaller.

According to the above configuration example, it is possible to adjust the contents of the first viscosity state and the second viscosity state in accordance with the position of the operation element.

In still another configuration example, the circuit may change the viscosity of the magnetorheological fluid by controlling an amplitude, a frequency, and an application time of current to be applied to the magnetic field generation section.

According to the above configuration example, the amplitude, the frequency, and the application time of the current to be applied to the magnetic field generation section are controlled to change the viscosity of the magnetorheological fluid. Thus, it is possible to control viscosity change by comparatively simple parameter designation.

In still another configuration example, among the amplitude, the frequency, and the application time, the circuit may change the amplitude and/or the application time without changing the frequency, to change the viscosity of the magnetorheological fluid into the first viscosity state or second viscosity state.

According to the above configuration example, in a case of changing the viscosity of the magnetorheological fluid using the amplitude, the frequency, and the application time of current to be applied to the magnetic field generation section, the amplitude and/or the application time of the current is adjusted with the frequency remaining constant, thereby performing control of changing the viscosity. Thus, by adjusting the viscosity without changing the frequency, for example, in a case of desiring to change the viscosity during operation of the operation element by the user, it is possible to prevent the user from perceiving a great change in an operation feeling due to the adjustment.

In still another configuration example, the circuit may increase the amplitude, and keep the application time constant or reduce the application time, to change the viscosity so as to increase.

According to the above configuration example, the viscosity is adjusted without changing the frequency. Thus, change in a feeling due to the adjustment can be prevented from being perceived as a great change by the user.

In still another configuration example, the first viscosity state may be such a state that the operation element is not autonomously restored to the initial position by the restoring force, or such a state that a speed of restoration of the operation element to the initial position is slower than in the second viscosity state.

According to the exemplary embodiments, the speed of return of the operation element to the initial position can be made faster in the controller using the magnetorheological fluid. In addition, it is possible to achieve both presentation of a feeling to the user by the operation element and an operation of the operation element returning to the initial position.

BRIEF DESCRIPTION OF THE DRAWINGS

FIG. 2 is a function block diagram showing a non-limiting example of the internal configuration of an information processing apparatus main body 2;

DETAILED DESCRIPTION OF NON-LIMITING EXAMPLE EMBODIMENTS

Figure 1:
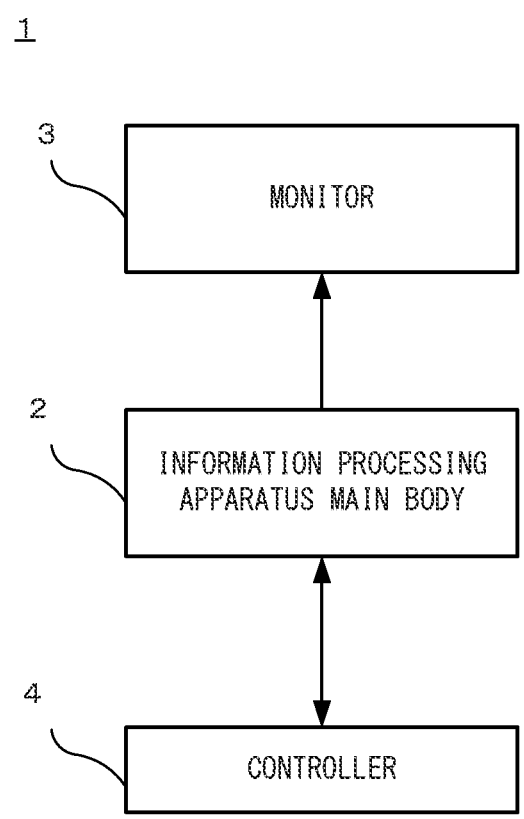
FIG. 1 shows a non-limiting example of the configuration of an information processing system 1.

First, with reference to FIG. 1, an example of an information processing system according to the exemplary embodiment will be described. FIG. 1 schematically shows the configuration of the information processing system according to the exemplary embodiment. In FIG. 1, an information processing system 1 includes an information processing apparatus main body 2, a monitor 3, and a controller 4. In the information processing system 1, the information processing apparatus main body 2 executes predetermined information processing, and predetermined images and sounds generated as a result of the processing are outputted to the monitor 3. In the exemplary embodiment, the controller 4 includes a communication section capable of wireless communication, and is used while being wirelessly connected with the information processing apparatus main body 2. In another exemplary embodiment, the information processing apparatus main body 2 and the controller 4 may be connected with each other via a wire. Data indicating the content of a user's operation performed on the controller 4 is transmitted from the controller 4 to the information processing apparatus main body 2. Also, data for controlling operation of the controller 4 is transmitted from the information processing apparatus main body 2 to the controller 4. A controller control section (described later) included in the controller 4 performs various controls of the controller 4, including transmission and reception of such data.

Next, the internal configuration of the information processing apparatus main body 2 will be described. FIG. 2 is a function block diagram showing an example of the internal configuration of the information processing apparatus main body 2. In FIG. 2, the information processing apparatus main body 2 includes a processor 11. The processor 11 is a circuit for controlling the information processing apparatus main body 2. The processor 11 executes various information processes to be executed in the information processing apparatus main body 2. The processor 11 may be formed of only a central processing unit (CPU), or may be formed of a system-on-a-chip (SoC) including a plurality of functions such as a CPU function and a graphics processing unit (GPU) function, for example. The processor 11 executes an information processing program (e.g., predetermined application program) stored in a storage section 12, thereby executing various information processes. The storage section 12 may be an internal storage medium such as a flash memory or a dynamic random access memory (DRAM), or may be configured using an external storage medium mounted to a slot (not shown), or the like, for example.

A video/sound output section 14 is electrically connected with the processor 11, and outputs various images and sounds generated as a result of information processing executed by the processor 11, to the monitor 3. A controller communication section 13 is connected with the processor 11. The controller communication section 13 is for transmitting and receiving various data to and from the controller 4 connected wirelessly.

Figure 3:
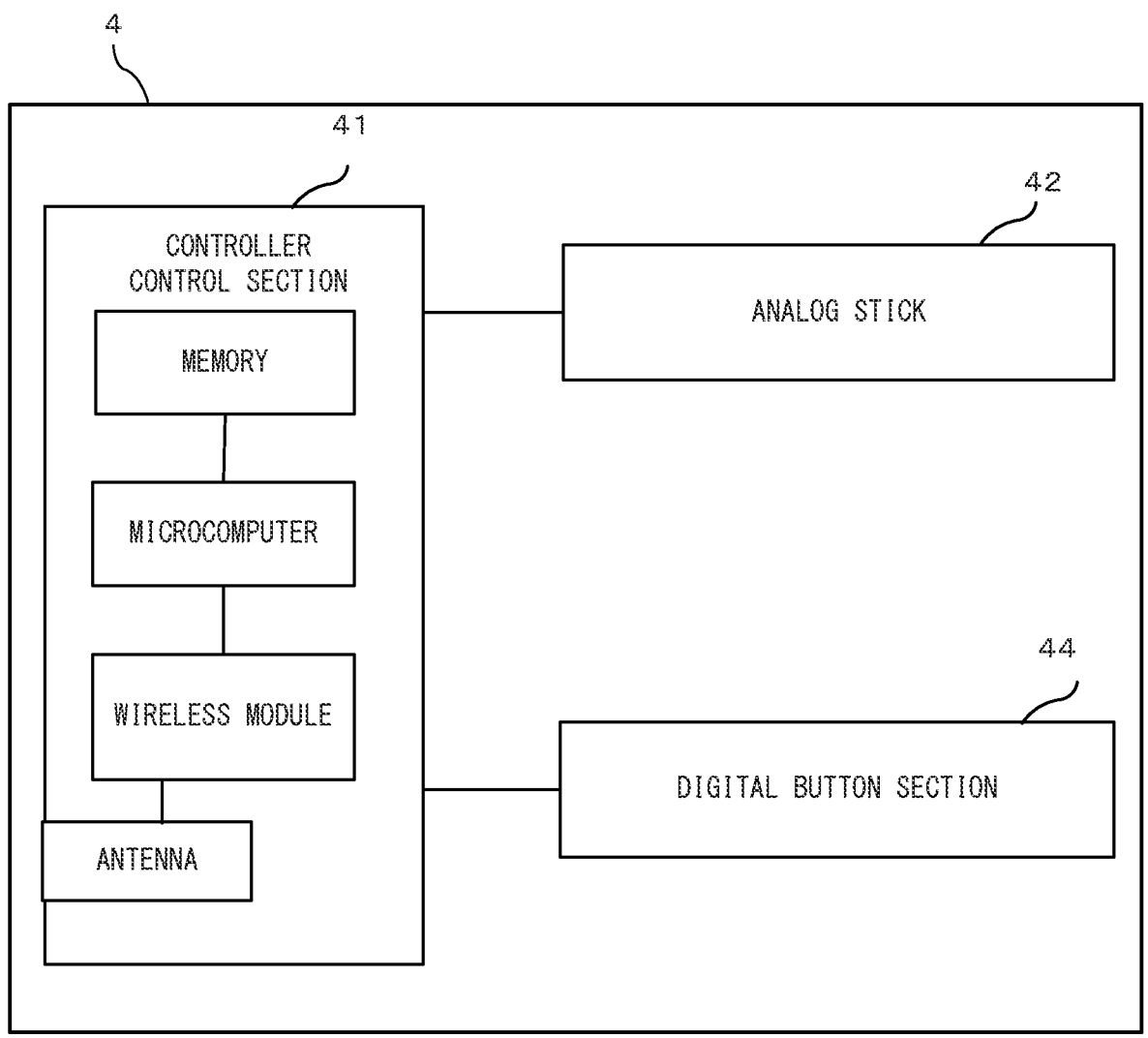
FIG. 3 is a function block diagram showing a non-limiting example of the internal configuration of a controller 4.

Next, the internal configuration of the controller 4 will be described. FIG. 3 is a function block diagram showing the internal configuration of the controller 4. In FIG. 3, the controller 4 includes a controller control section 41, an analog stick 42, and a digital button section 44. In the exemplary embodiment, a case where the controller 4 includes only one analog stick 42 is described. In another exemplary embodiment, the controller 4 may include a plurality of analog sticks 42. In addition, the controller 4 includes a battery and the like (not shown). Further, the controller 4 may include sensors such as an optical sensor and an inertial sensor.

The controller control section 41 is a circuit for controlling the controller 4, and includes, for control, a microcomputer, a memory, a wireless module, an antenna, and the like. While using the memory as a storage area in processing, the controller control section 41 controls the wireless module for wirelessly transmitting transmission data to the information processing apparatus main body 2. In the memory, data of a preset library and the like described later are also stored. In addition, the controller control section 41 performs processing such as control for the analog stick 42 as described later, in accordance with data received by the wireless module from the information processing apparatus main body 2 via the antenna.

The analog stick 42 is an operation element on which a direction can be inputted. A user can input a direction corresponding to a tilt direction by tilting the analog stick 42 (and input a magnitude corresponding to the tilt angle). The digital button section 44 includes at least one press-type button and/or trigger-type button.

Next, the configuration of the analog stick 42 in the exemplary embodiment will be described. In the exemplary embodiment, a configuration using a magnetorheological fluid (hereinafter, referred to as MRF) is adopted for the analog stick 42. Here, the MRF will be briefly described. The MRF has such characteristics that the MRF is a fluid when not subjected to a magnetic field, and comes into a semi-solid state (exhibits viscosity) when subjected to a magnetic field. In addition, the MRF also has characteristics of reacting to a magnetic field in several milliseconds. In the exemplary embodiment, the viscosity of the MRF is controlled and the MRF is caused to act on a movable axis of the analog stick 42 of the controller 4, whereby movability of the analog stick 42 is dynamically controlled.

Figure 4:
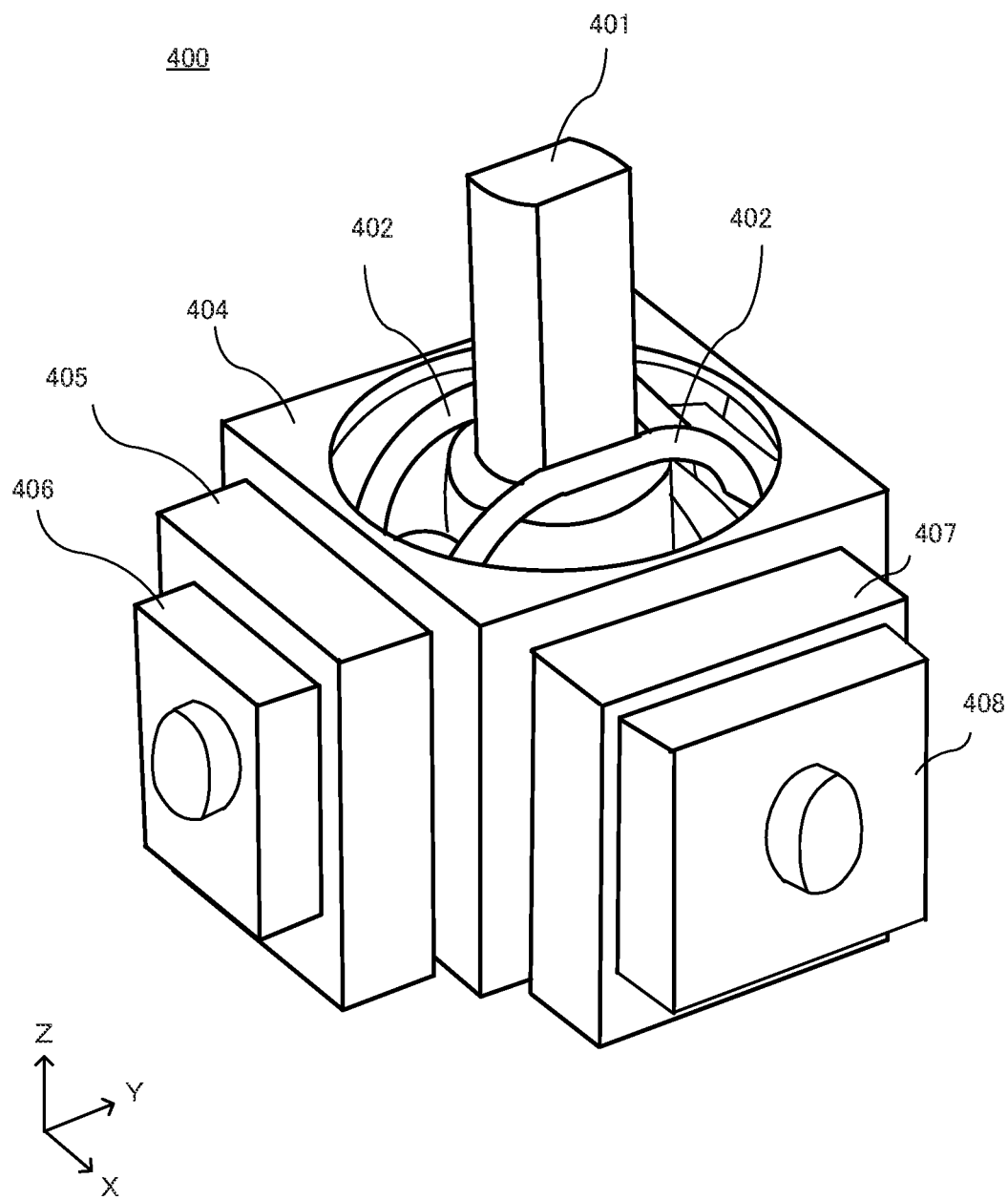
FIG. 4 is a perspective view showing a non-limiting example of a stick device.

FIG. 4 shows an example of the outer appearance of parts (hereinafter, stick device) composing the analog stick 42 assumed in the exemplary embodiment. FIG. 4 is a perspective view of a stick device 400 composing the analog stick 42. In FIG. 4, the stick device 400 includes a stick portion 401, an outer enclosure 404, an X-axis variable resistor 405, an X-axis MRF unit 406, a Y-axis variable resistor 407, and a Y-axis MRF unit 408. Also, X-axis drive components 402 are provided adjacently to the stick portion 401. Although not shown, the stick device 400 further includes Y-axis drive components 403 described later. In a completed product of the controller 4, for example, a mushroom-shaped cover is put over the stick portion 401 of the stick device 400.

The stick portion 401 is a stick-shaped movable part. The X-axis variable resistor 405 and the Y-axis variable resistor 407 are for detecting the tilt degree of the stick portion 401. The X-axis MRF unit 406 and the Y-axis MRF unit 408 are for causing the MRF to act on the movable axis of the analog stick 42, as described above.

Figure 5:
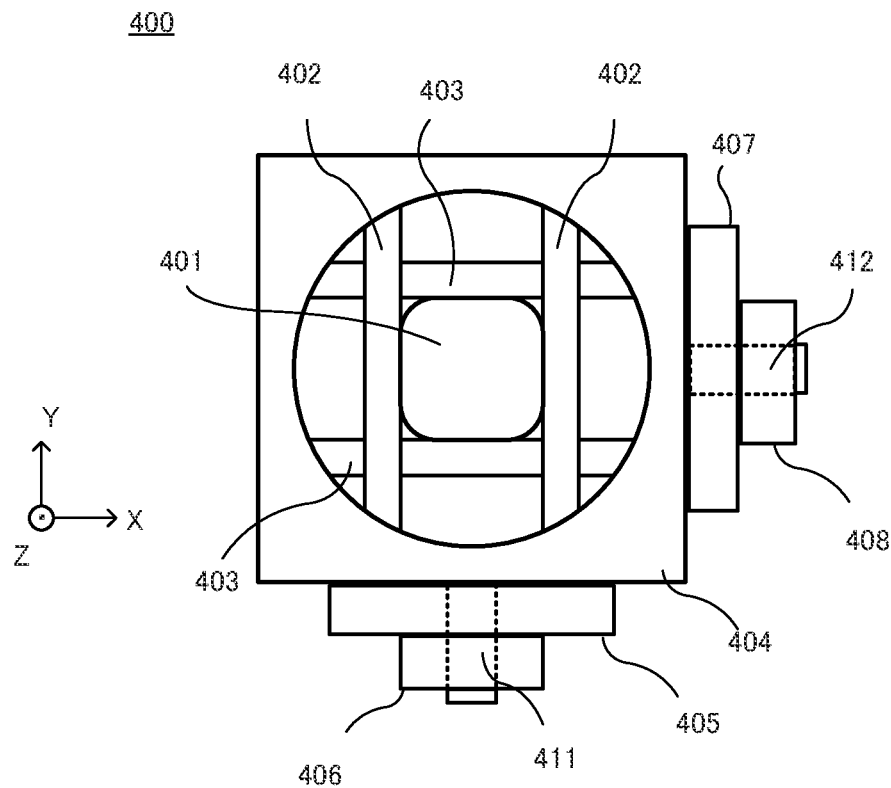
FIG. 5 is a schematic view showing a non-limiting example of the positional relationship among parts of the stick device.
Figure 6:
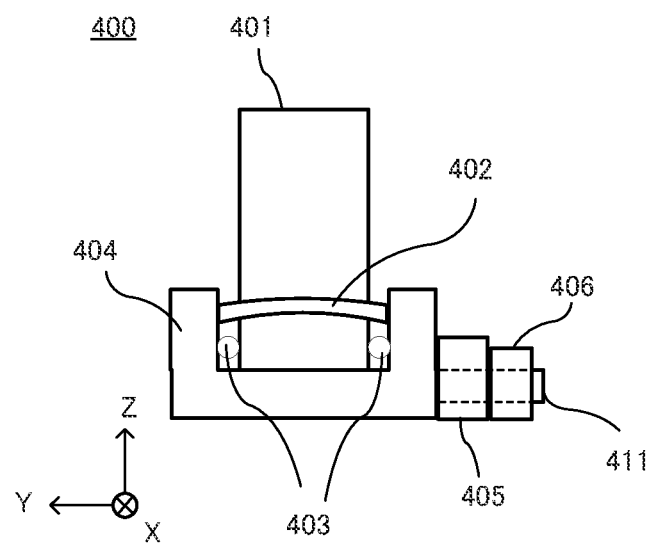
FIG. 6 is a schematic view showing a non-limiting example of the positional relationship among parts of the stick device.
Figure 7:
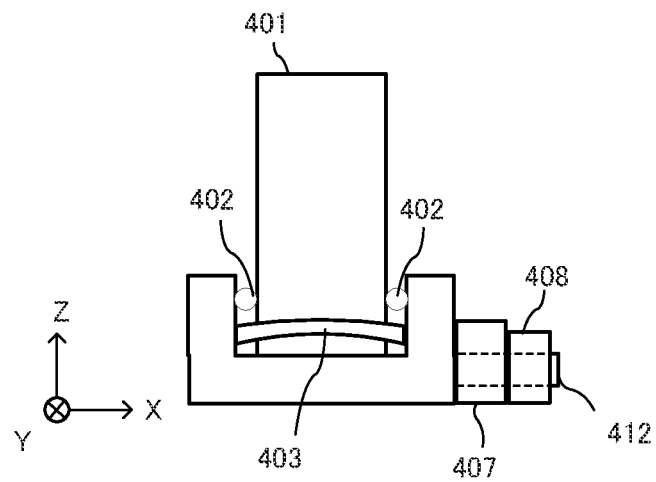
FIG. 7 is a schematic view showing a non-limiting example of the positional relationship among parts of the stick device.

FIG. 5 is a schematic view showing the positional relationship among parts when the stick device 400 is viewed from above. FIG. 6 and FIG. 7 are schematic views (sectional views) showing the positional relationship among parts when the stick device 400 is viewed from lateral sides.

FIG. 6 is a view as seen from the left side in FIG. 5, and FIG. 7 is a view as seen from the lower side in FIG. 5. As shown in FIG. 5 to FIG. 7, the stick portion 401 is placed such that the center of the stick portion 401 is located at the center position of the outer enclosure 404. In addition, the stick portion 401 is placed such that the longitudinal direction thereof is parallel to the Z axis. In the following description, the position of the center is referred to as an initial position, and an orientation in which the longitudinal direction of the stick portion 401 is parallel to the Z axis is referred to as an initial state.

In FIG. 5, the X-axis drive components 402 and the Y-axis drive components 403 are provided adjacently to the stick portion 401. The X-axis drive components 402 move the X-axis variable resistor 405 in coordination with movement in the X axis of the stick portion 401. The Y-axis drive components 403 move the Y-axis variable resistor 407 in coordination with movement in the Y axis of the stick portion 401. Therefore, although not directly shown in the drawings, the X-axis drive components 402 are connected to the X-axis variable resistor 405 so as to coordinate therewith (inside the outer enclosure 404). Similarly, the Y-axis drive components are connected to the Y-axis variable resistor 407 so as to coordinate therewith.

Regarding the movable range of the stick, in the exemplary embodiment, in a case of tilting the stick portion 401, the stick portion 401 can be tilted up to the edge of a circular opening provided to the outer enclosure 404. That is, the circular opening restricts a basic movable area of the stick portion 401 (analog stick 42). In another exemplary embodiment, as a member for the restriction, for example, a restriction member having a similar function may be provided at a base part of the stick portion 401. Alternatively, in a completed product of the controller 4, a housing of the controller 4 may be used as a restriction member. That is, the housing may be provided with an opening having a predetermined shape, at a part where the stick device 400 is attached, so that the edge of the opening (shape) serves as a limitation boundary of the movable area of the analog stick 42.

Although not shown, a restoring force imparting section which is a mechanism for restoring the stick portion 401 to the initial position is provided below the stick portion 401. The restoring force imparting section is formed by a member or the like that has therein an elastic body such as a coil spring and transmits a restoring force for returning to the initial position so as to bring back the stick portion 401 into a vertical condition. In the exemplary embodiment, the greater the tilt of the stick portion 401 is, the greater the restoring force for returning to the initial position is. In addition, the restoring force imparting section works to restore the above drive components coordinating with the stick portion 401 to reference positions. A mechanism for imparting the restoring force is a known one and therefore the detailed description thereof is omitted. For example, the restoring force imparting section having the elastic body may be placed vertically to the bottom surface of the outer enclosure 404. Then, the drive body may be kept in a reference state by forces being applied directly or indirectly to the drive components.

Regarding the restoring force imparting section, the elastic body is used in the exemplary embodiment. In another exemplary embodiment, for example, a restoration mechanism using a magnet or the like may be adopted as long as the same function is exerted. A configuration of imparting the restoring force constantly may be adopted, or such a restoration mechanism that enables the restoring force to be imparted only when necessary or enables control of the magnitude of the restoring force, may be adopted. In this case, a gear, a motor, and the like may be used in addition to or instead of the elastic body, the magnet, and the like.

The stick device 400 has the X-axis variable resistor 405 and the Y-axis variable resistor 407 adjacently to the outer enclosure 404. The variable resistor is a known technology and therefore the detailed description thereof is omitted. The X-axis variable resistor 405 and the Y-axis variable resistor 407 are for detecting the tilt degree of the stick portion 401. Each variable resistor is provided with a rotary shaft connected to the above drive components. The drive components rotate the rotary shaft in coordination with tilt and restoration movements of the stick portion 401. Then, a resistance value corresponding to the rotation of the rotary shaft is detected. On the basis of the resistance value, the processor 11 or the controller control section 41 can determine the tilt angle and the like on each of the X axis and the Y axis of the stick portion 401. That is, it is possible to calculate the direction in which the stick portion 401 moves (hereinafter, displacement direction) and the tilt degree of the stick portion 401 (the indicated position of the analog stick 42 on the XY plane; hereinafter, simply referred to as "position of the analog stick").

In the exemplary embodiment, the displacement direction of the stick portion 401 is calculated with software means by the processor 11 or the controller control section 41. However, a main component that performs this calculation is not limited to the above ones. For example, in another exemplary embodiment, a configuration in which the displacement direction is mechanically detected using a predetermined sensor may be adopted.

The stick device 400 has the X-axis MRF unit 406 adjacently on the outer side of the X-axis variable resistor 405. Similarly, the stick device 400 has the Y-axis MRF unit 408 adjacently on the outer side of the Y-axis variable resistor 407. In the exemplary embodiment, the rotary shaft 411 used in the X-axis variable resistor 405 extends outward, and the X-axis MRF unit 406 is provided so as to surround the rotary shaft 411. Similarly, the rotary shaft 412 used in the Y-axis variable resistor 407 extends outward, and the Y-axis MRF unit 408 is provided so as to surround the rotary shaft 412. Regarding the rotary shaft, for example, a configuration in which the rotary shaft used in the X-axis variable resistor 405 is connected with a rotary shaft in the MRF unit so as to coordinate therewith, may be adopted. In the following description, the X-axis MRF unit 406 and the Y-axis MRF unit 408 may be collectively referred to as MRF units.

Figure 8:
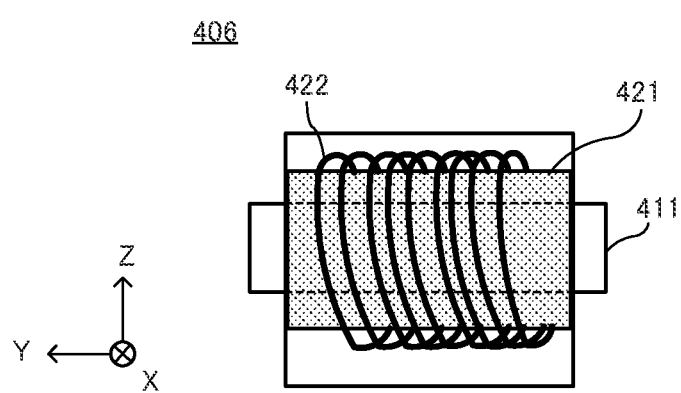
FIG. 8 is a schematic view illustrating a non-limiting example of the configuration of an MRF unit.

Next, the configuration of the MRF unit will be described. FIG. 8 is a simplified schematic view illustrating a configuration example of the MRF unit. In FIG. 8, the rotary shaft 411 (a part thereof) connected (or joined) to the variable resistor penetrates an MRF container 421 containing an MRF. A magnetic field generation section 422 is provided so as to surround the outer side of the MRF container 421. The magnetic field generation section 422 is a coil, for example. The MRF unit is configured to be capable of causing current to flow through the magnetic field generation section 422. It is possible to generate a magnetic field by causing a predetermined amount of current to flow through the magnetic field generation section 422. Thus, the viscosity of the MRF in the MRF container 421 can be changed. That is, by controlling the amount (i.e., amplitude) of current to be applied to the magnetic field generation section 422, it is possible to control the intensity of the magnetic field and thus control the magnitude of the viscosity of the MRF. By increasing the viscosity of the MRF, it is possible to impart resistance against the rotational force of the rotary shaft 411. Since the rotary shaft 411 is connected so as to coordinate with the tilt of the stick portion 401 as described above, it is possible to impart a resistance force against a force to tilt the stick portion 401, through change in the viscosity of the MRF. That is, in the exemplary embodiment, the configuration is made such that movability of the stick portion 401 can be controlled by controlling the viscosity of the MRF as described above.

The view in FIG. 8 is shown in a simplified manner, for convenience of description. A supplementary description will be given about a more specific configuration of the MRF unit. A basic mechanism thereof is a structure similar to a disc brake of a bicycle or an automobile. Such a disc brake has a mechanism in which a rotating wheel is directly squeezed by mechanical parts to stop rotation by friction between parts. In a case of using the MRF as in the exemplary embodiment, a frictional force is changed through control of the viscosity of the fluid, whereby movement in the rotational direction is restricted.

Figure 9:
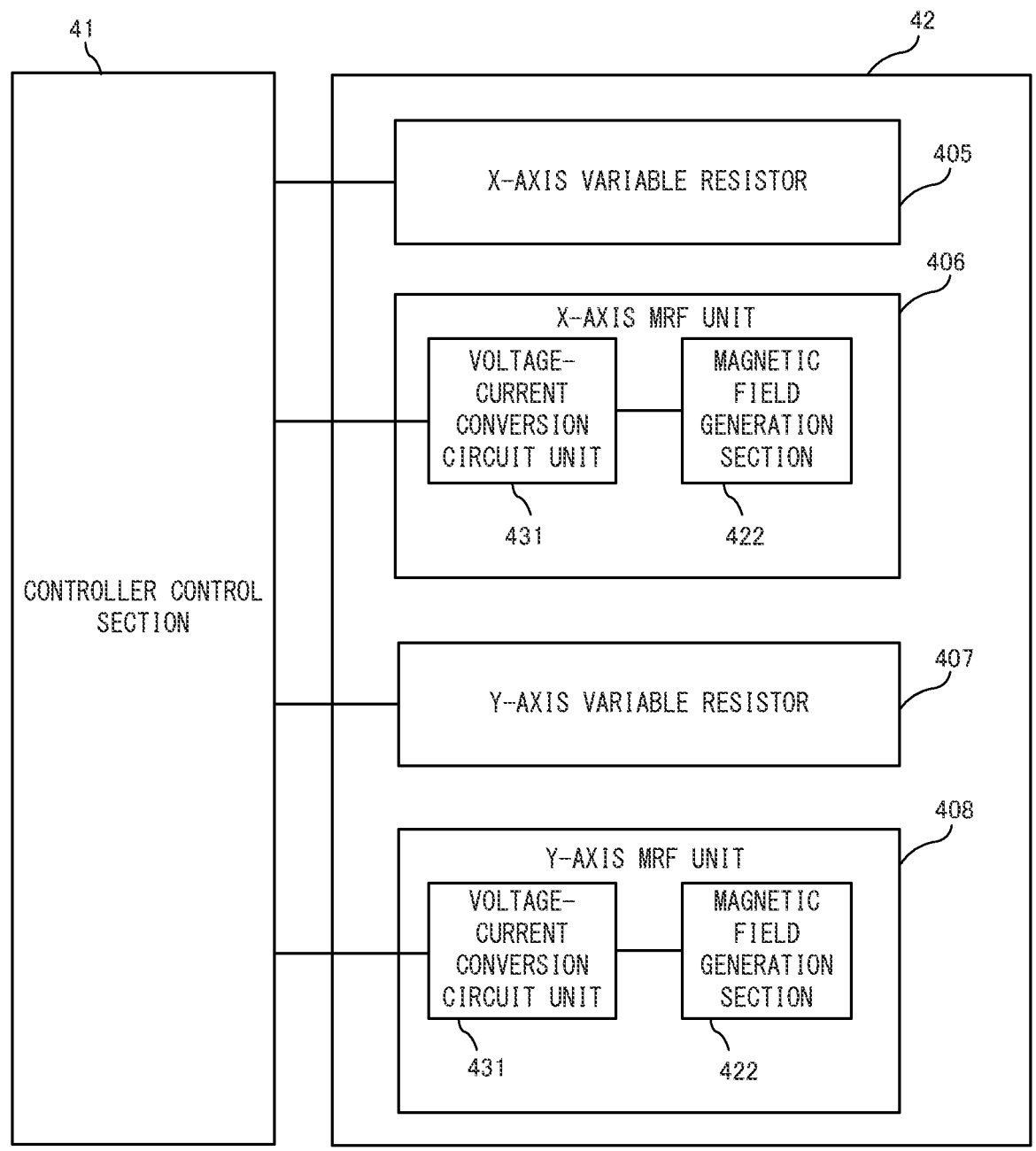
FIG. 9 is a function block diagram showing a non-limiting example of the internal configuration of an analog stick 42.

Next, the internal (electrical) configuration of the analog stick 42 will be described. FIG. 9 is a function block diagram showing the internal configuration of the analog stick 42. In FIG. 9, the analog stick 42 includes the X-axis variable resistor 405, the X-axis MRF unit 406, the Y-axis variable resistor 407, and the Y-axis MRF unit 408. These components are electrically connected with the controller control section 41, and predetermined data can be transmitted and received therebetween. The controller control section 41 can receive signals (e.g., voltage values) of the X-axis variable resistor 405 and the Y-axis variable resistor 407. On the basis of these signals, the controller control section 41 can calculate the position of the stick portion 401, the displacement direction thereof, and the change speed (displacement speed) of the position. The controller control section 41 can transmit a calculation result to the information processing apparatus main body 2. The position of the analog stick 42 is represented as two-dimensional coordinates on a two-dimensional plane with the center position as the initial position (origin), for example. On the basis of data transmitted from the information processing apparatus main body 2, the controller control section 41 can transmit, to each MRF unit, a signal for controlling the viscosity of the MRF unit, as described below.

Next, the MRF units will be described. The X-axis MRF unit 406 includes a voltage-current conversion circuit unit 431, and the magnetic field generation section 422 as described above, and both units are electrically connected to each other. When predetermined voltage is given to the voltage-current conversion circuit unit 431 from the controller control section 41, current based on the voltage can be outputted to the magnetic field generation section 422. As a result, the viscosity of the MRF can be changed as described above. Similarly, the Y-axis MRF unit 408 includes a voltage-current conversion circuit unit 431 and the magnetic field generation section 422, and the same control as described above can be performed. Thus, in the exemplary embodiment, it is possible to cause an influence due to viscosity change of the MRF, individually on each of the X axis and the Y axis in the stick portion 401. Basically, movability (viscosity) of the analog stick 42 is represented by the sum of values on two axes, i.e., the X axis and the Y axis. Meanwhile, for example, by increasing only the viscosity of the MRF of the Y-axis MRF unit 408, it is possible to make a state in which the stick portion 401 can be moved only in the X axis direction.

By performing viscosity control for the MRF with the above configuration, in the exemplary embodiment, it is possible to present various feelings to the user (user's fingers) operating the analog stick 42. For example, by controlling the viscosity of the MRF in accordance with a predetermined scene in an application, it is possible to give various feelings corresponding to the scene, to the fingers of the user operating the analog stick 42. In a case where the controller 4 includes a plurality of analog sticks 42, it is possible to control the viscosity of each analog stick individually. Thus, it is possible to provide an unprecedented new operation feeling to the user.

Figure 10:
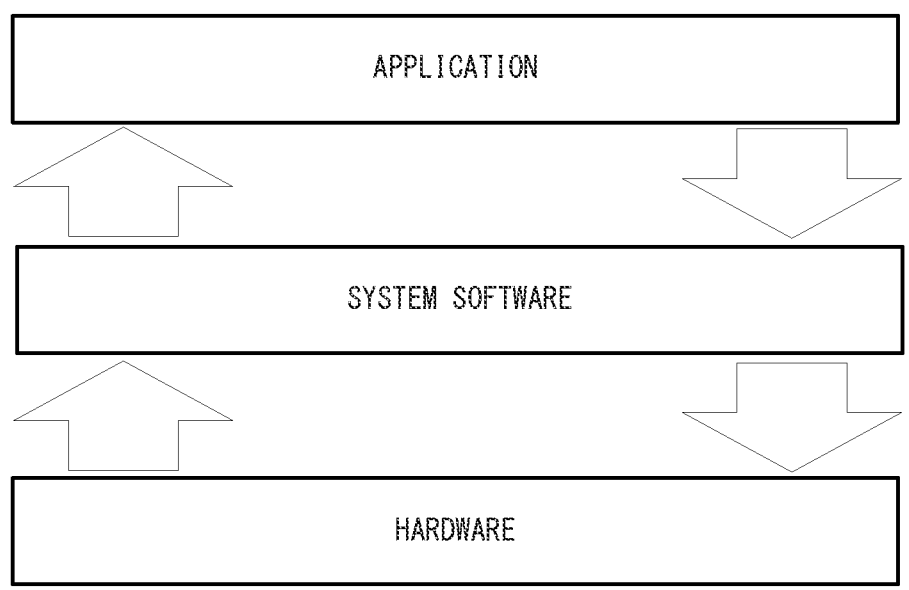
FIG. 10 illustrates a non-limiting example of software layers.

Hereinafter, various controls using the above configuration in the exemplary embodiment will be described. Prior to this, software layers in the information processing system of the exemplary embodiment will be described. FIG. 10 illustrates software layers in the exemplary embodiment. In the information processing system of the exemplary embodiment, various applications can be executed. These applications basically operate (are used) on common system software, according to the software structure. The system software serves for control of various pieces of hardware forming the information processing system 1. The hardware includes the information processing apparatus main body 2 and the controller 4 including the MRF units and the like, for example.

Here, parameters for controlling the MRF will be described. In the exemplary embodiment, as MRF control parameters for controlling the MRF, there are three kinds of parameters below. That is, the three kinds of parameters are (1) a viscosity parameter, (2) movable area information, and (3) a preset number. The MRF control parameters are used as follows, for example. First, the contents of the parameters are set in an application, and they are sent to the controller 4 via the system software. Then, the controller 4 controls the viscosity of the MRF on the basis of the MRF control parameters, as an example.

Each parameter will be described. The viscosity parameter includes parameters designating three values, i.e., an amplitude, a frequency, and an application time (corresponding to parameters P1 to P3 described later) to be outputted from the controller control section 41 to the voltage-current conversion circuit unit 431. A voltage command value having a waveform containing these parameters as components is outputted to the voltage-current conversion circuit unit 431, and current based on this is outputted to the magnetic field generation section 422. As a result, a magnetic field is generated and changes the viscosity of the MRF.

Figure 11:
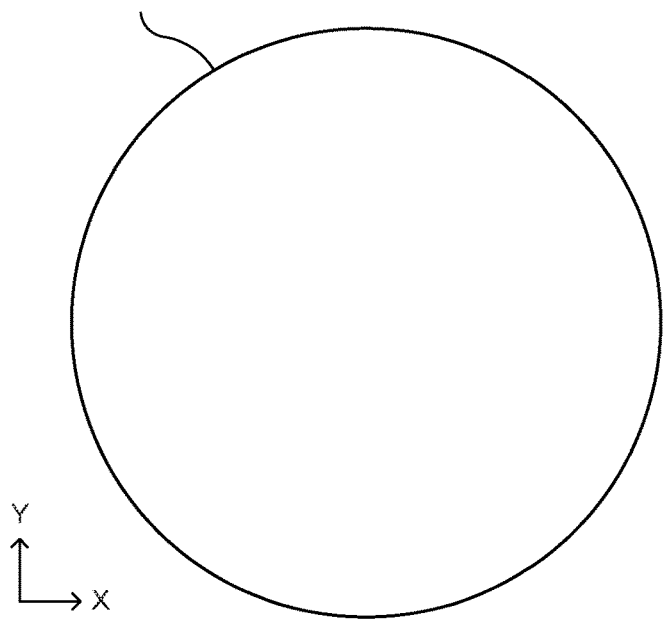
FIG. 11 illustrates a non-limiting example of movable area information.
Figure 12:
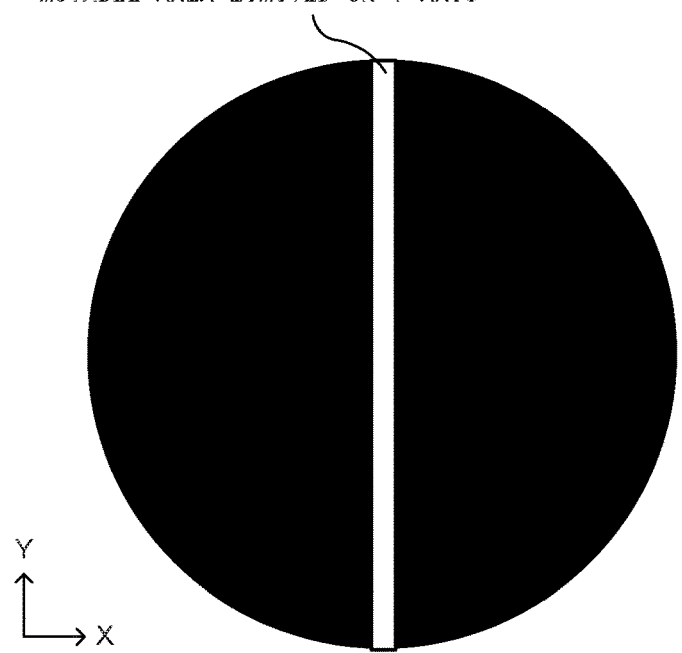
FIG. 12 illustrates a non-limiting example of movable area information.

The movable area information is information defining the movable area of the analog stick 42. For example, a case where the movable area of the analog stick 42 is made to be an area only in the Y axis direction, is assumed. With reference to the drawings, first, the original movable area (hereinafter, referred to as basic movable area) is defined to be a circle area shown in FIG. 11. Then, a case of limiting the movable area to an area only in the Y axis direction as shown by a white part in FIG. 12, is assumed. In this case, in order to prevent the analog stick 42 from moving into a black area in FIG. 12, the content of the movable area information is set so as to indicate that the analog stick 42 does not tilt when the position of the analog stick 42 is to move into the black area. By this setting, even if the user attempts to move the analog stick 42 from the white part to the black area, the analog stick 42 can be prevented from tilting toward the black area at the boundary position, and as a result, a state in which the analog stick 42 cannot enter the black area can be realized. As a specific example of the data structure, a matrix of 100×100 regarded as the entire basic movable area is prepared, and a value indicating whether or not each position is in a movable area is set in a binary manner (0 or 1) on the matrix, thereby generating the movable area information. Regarding the example in FIG. 12, in the matrix, elements corresponding to the black part are set at 1, and the other elements are set at 0, thus constituting the content of the movable area information. As a matter of course, a specific data structure of the movable area information is not limited thereto, and any data structure may be adopted as long as the movable area can be defined. As described above, in the exemplary embodiment, information defining the movable area (the shape thereof) of the analog stick 42 in any way can be used as the movable area information.

The preset number is a number designating a preset defined in advance. The preset is data defining in advance what viscosity parameter is set for each position (in the basic movable area) where the analog stick 42 is located. In other words, the preset is data designating in advance a viscosity parameter with respect to each position in the basic movable area and the displacement speed of the analog stick 42 at the position. With such presets prepared, a person such as an application developer can easily use viscosity control for the MRF merely by designating the preset without designing and setting the content of the viscosity parameter each time. As an example of the data structure, data in which viscosity parameters are set for each of a predetermined number of matrices regarded as the entire basic movable area as described above may be defined as the presets. In the exemplary embodiment, a plurality of the presets are stored in advance as a "preset library" in a memory in the controller control section 41. As a usage example of the preset, an application transmits a predetermined preset number to the controller control section 41 via the system software. In this case, the controller control section 41 reads a corresponding preset number from the preset library. Further, the viscosity parameter is determined on the basis of the content of the preset, and the position and the displacement speed of the analog stick 42 at this time. Then, the controller control section 41 controls the MRF unit on the basis of the viscosity parameter.

In the above description, information provided as the preset has the viscosity parameter, and the position and the displacement speed, so as to be associated with each other. However, the preset is not limited to this data structure. In another exemplary embodiment, for example, a data structure merely having a viscosity parameter without having information of a position and a displacement speed may be adopted. That is, data in which several viscosity parameters are merely defined in advance may be provided as presets.

Regarding the preset library, a movable area preset defining only a movable area and a preset defining only the viscosity parameter may be separately provided. For example, it is assumed that there is a preset of concentric movable areas. In this case, viscosities of the MRF for the center circle and the surrounding annular areas may be taken from a preset of viscosity parameters prepared separately. Thus, while adopting a preset configuration, it is possible to increase varieties of expressions using the MRF.

The preset library stored in the controller control section 41 may be allowed to be updated. For example, the preset library may be updated regularly via the Internet. Alternatively, even in a case of not being connected to the Internet, the preset library may be updated via a predetermined storage medium. As an example, the information processing apparatus main body 2 connected to the controller 4 may read a memory card containing update data, whereby the preset library may be updated.

Instead of or in addition to the configuration in which the controller control section 41 stores the preset library, such a configuration that a preset is defined in the system software or an application may be adopted.

Next, the relationship among the application, the system software, and the controller 4 in terms of a main component that performs viscosity control for the MRF will be described. The exemplary embodiment mainly relates to control of the controller 4 using the MRF unit, in other words, viscosity control for the MRF. In the exemplary embodiment, as a main component that controls (designates and generates) the viscosity, three patterns are assumed: a case of the application, a case of the system software, and a case of the controller 4. In other words, as a viscosity control method for the MRF, basically the following three patterns can be used: a case of performing control mainly by the application, a case of performing control mainly by the system software, and a case of performing control mainly by the controller 4.

One of reasons for assuming such a plurality of control patterns is that a difference between the communication speed between the information processing apparatus main body 2 and the controller 4 and the execution speed of the application executed by the information processing apparatus main body 2 (in other words, difference in response performance) is taken into consideration. These speeds can have a relationship: "the communication speed between the analog stick 42 and the controller control section 41>the communication speed between the information processing apparatus main body 2 and the controller control section 41>the processing speed of the application". In the exemplary embodiment, for example, it is assumed that the communication speed between the analog stick 42 and the controller control section 41 is 1 kHz and the communication speed between the information processing apparatus main body 2 and the controller control section 41 is 200 Hz. In addition, regarding the processing speed of the application, it is assumed that the application operates at 60 Hz. In this speed relationship, the operation cycle at the controller side is faster than the operation cycle at the application side. Therefore, in a case where the application side performs a main role of outputting the viscosity of the MRF, it is considered that the cycle at which the output reaches the controller control section 41 is slower than the cycle at which the controller control section 41 acquires the position of the analog stick 42. In this regard, in particular, in a case of performing control of changing the viscosity directly in accordance with the position of the analog stick 42, having higher response can realize more immediate viscosity change, and thus it is considered that varieties of expressions for presenting feelings also increase. For example, sharp change in feeling and an edge-like feeling expression become possible. From this standpoint, it can be said that a control method that is as less through the application as possible is desirable. On the other hand, a memory capacity provided to the controller control section 41 is not very large in general, and therefore it is assumed that the number of the presets that can be stored is limited to a certain extent. In this regard, performing control mainly at the application side is likely to allow more various presets to be used. Alternatively, generating the viscosity parameter without depending on the preset, for example, makes it possible to output the viscosity parameter more finely, thus increasing the degree of freedom in viscosity control. In particular, in a case of performing viscosity control without directly being based on the position of the analog stick 42, response might not need to be very high. Therefore, in the exemplary embodiment, a developer can selectively use the above control patterns in accordance with the content of the application to be developed, the use case, and the like.

Hereinafter, the summary of the above various control patterns will be described.

[Case of Performing Control by Application]

Figure 13:
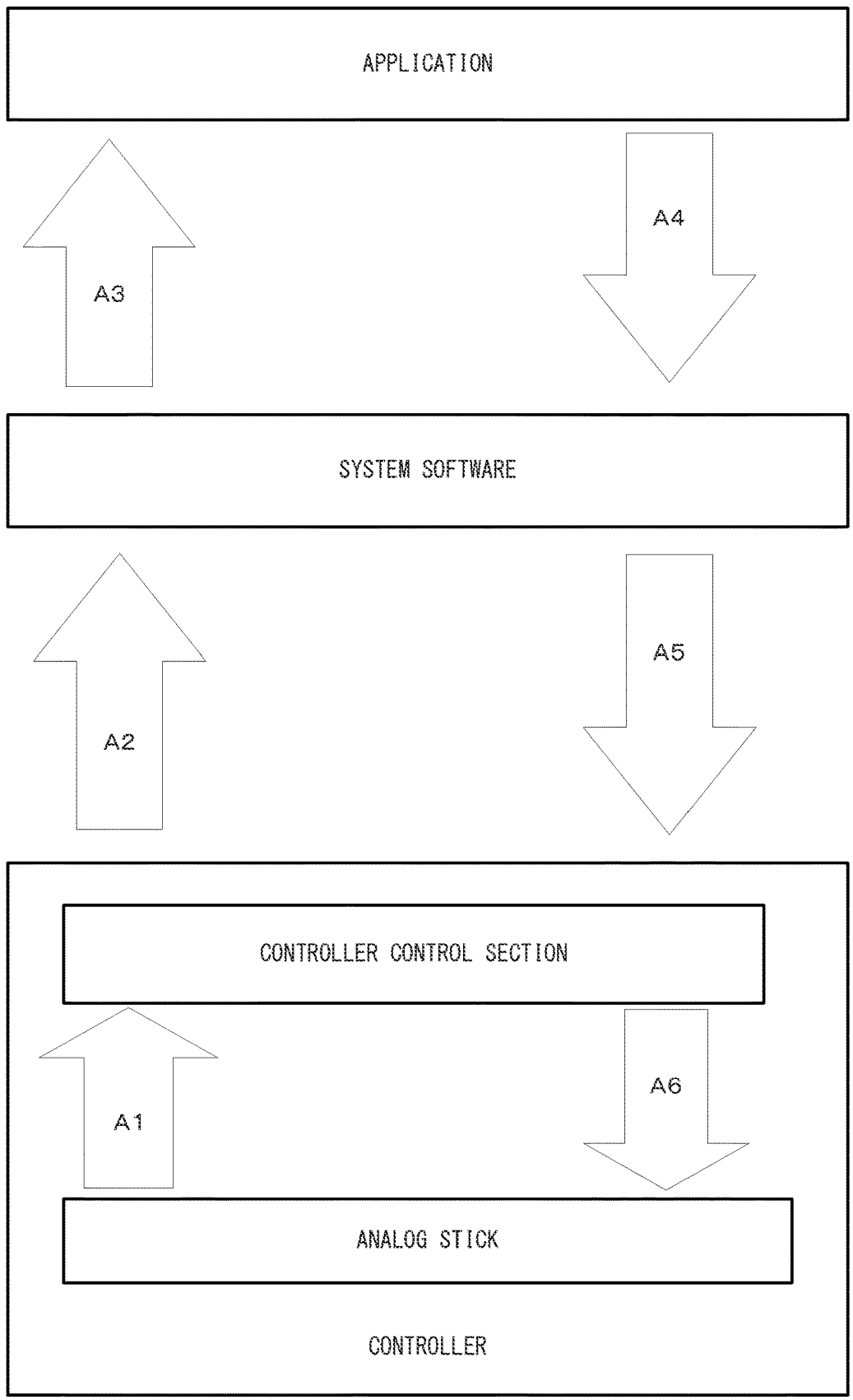
FIG. 13 illustrates a non-limiting example of a control pattern A.

First, a case of performing control mainly by the application (hereinafter, referred to as control pattern A) will be described. Here, as an example, control in which the application outputs the viscosity parameter directly on the basis of the execution state of the application, will be described. Flow of control in this case is, for example, as shown in FIG. 13. First, (A1) the controller control section 41 receives voltage values from the analog stick 42. Next, (A2) on the basis of the voltage values, the controller control section 41 calculates the position and the displacement speed of the analog stick 42, and sends them to the system software. Further, (A3) the system software outputs the position and the displacement speed of the analog stick 42 to the application. Thus, at the application side, the position and the displacement speed of the analog stick 42 can be obtained. Next, (A4) at the application side, application processing is performed so as to reflect the position and the displacement speed of the analog stick 42 outputted from the system software, and the viscosity parameter is generated on the basis of the execution state of the application resulting from the application processing, and is sent to the system software. The execution state of the application is, for example, the position of a virtual object in a virtual space, the state of the virtual object, whether or not the progress status of the application corresponds to a predetermined scene, and the like. Next, (A5) the system software sends the viscosity parameter to the controller control section 41. Then, (A6) the controller control section 41 outputs a voltage command value based on the viscosity parameter to the MRF unit. As described above, in this control pattern, control is performed such that the application performs a main role of outputting the viscosity control parameter directly on the basis of the state of the application.

The application may be configured to generate and output the viscosity parameter, or may be configured such that a viscosity library storing predetermined presets is prepared at the application side. In the latter case, if each preset has such a data structure that merely has a viscosity parameter without having information of the position and the displacement speed of the analog stick, a predetermined preset number may be designated from the library and the viscosity parameter corresponding to the preset number may be acquired and outputted. If the preset has such a data structure that data such as the application state is associated with the viscosity parameter, the viscosity parameter may be acquired on the basis of the preset number and data such as the application state.

In the above example, the viscosity parameter is outputted directly on the basis of the execution state of the application. However, the viscosity parameter may be outputted directly on the basis of the position of the analog stick. In this case, the position of the analog stick may be transmitted to the application side, and the viscosity parameter may be generated directly on the basis of the position of the analog stick. Then, the generated viscosity parameter may be outputted to the controller control section 41.

[Case of Performing Control by Controller]

Figure 14:
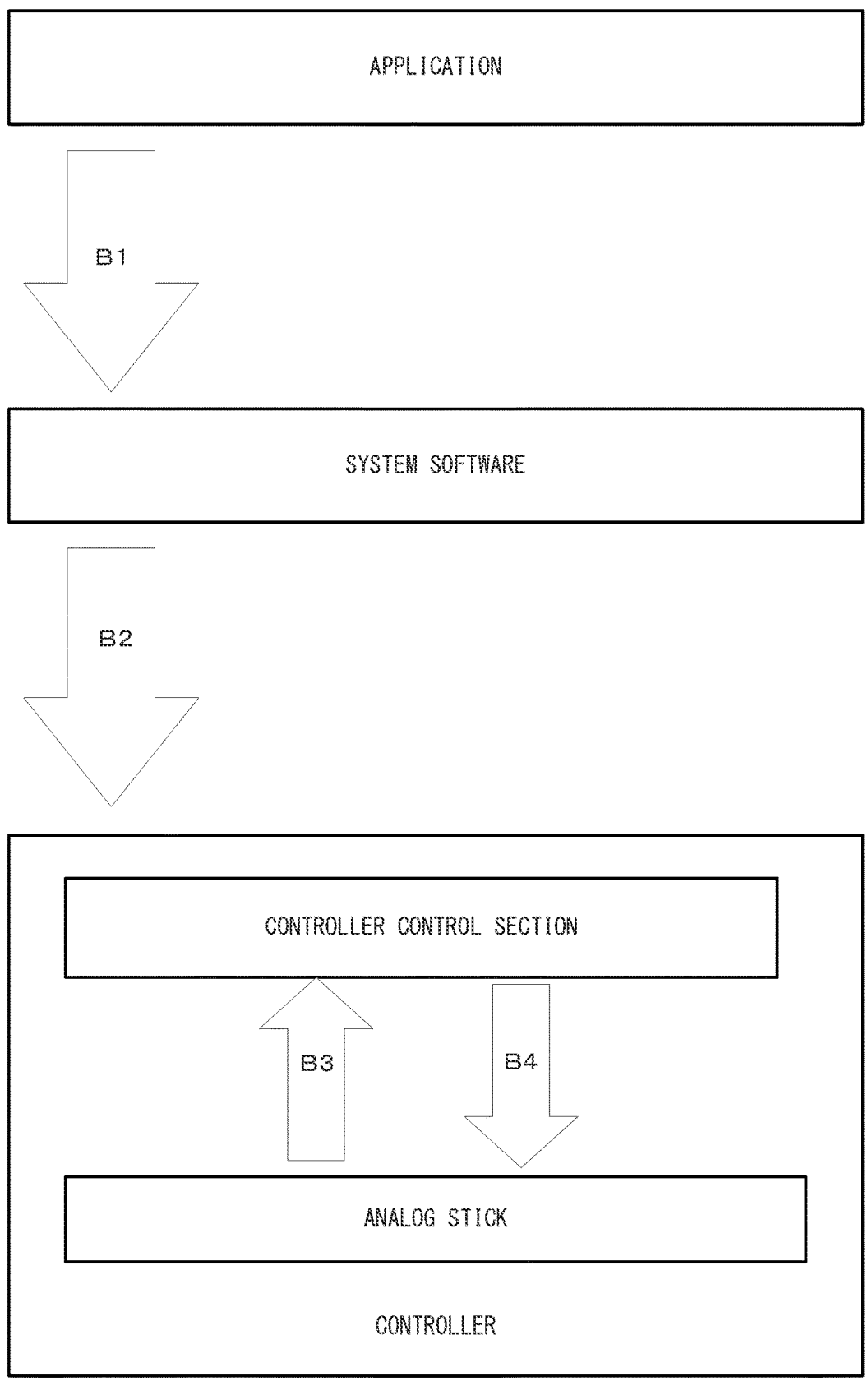
FIG. 14 illustrates a non-limiting example of a control pattern B.

Next, a case of performing control mainly by the controller 4 will be described. In the exemplary embodiment, as an example, control is performed using the preset library stored in the controller control section 41 as described above. Flow of this control is, for example, as shown in FIG. 14 (hereinafter, this control is referred to as control pattern B). First, (B1) the application designates a predetermined preset number and sends the preset number to the system software. (B2) The system software sends the preset number to the controller control section 41. (B3) The controller control section 41 calculates the position and the displacement speed of the analog stick 42 on the basis of voltage values from the analog stick 42 at this time. (B4) Next, the controller control section 41 acquires the preset corresponding to the preset number from the preset library. Then, the controller control section 41 acquires the viscosity parameter on the basis of the defined content of the preset and the calculated position and/or displacement speed of the analog stick 42. Then, the controller control section 41 outputs a voltage command value based on the viscosity parameter to the MRF unit. As described above, merely by the preset number being designated from the application, viscosity control based on the corresponding preset is performed in the controller 4.

Figure 15:
FIG. 15 illustrates a non-limiting example of a control pattern C.
Figure 15:
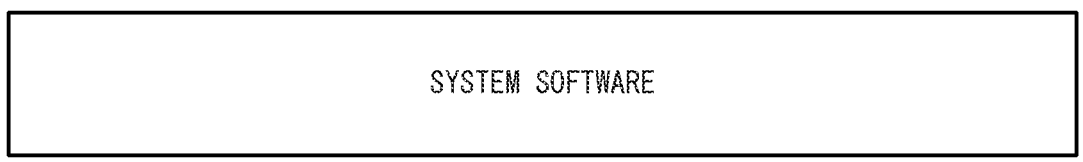
Figure 15:
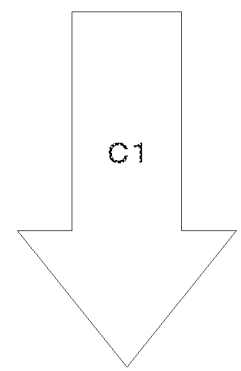
Figure 15:
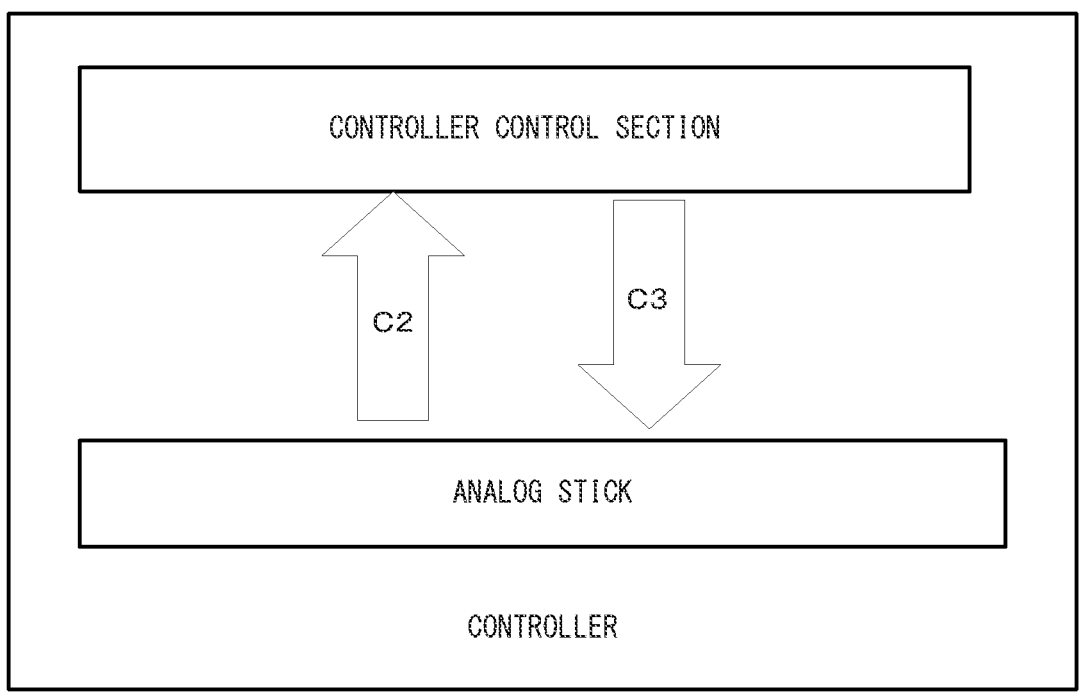

As another example of the case of performing control mainly by the controller 4, control as shown in FIG. 15 may be performed (hereinafter, this control is referred to as control pattern C). In this case, it is assumed that the viscosity of the MRF is controlled irrespective of the application. For example, a case of allowing the viscosity to be set as preferred by the user is conceivable. In this case, for example, the user may designate any viscosity from a "setting menu" on the information processing apparatus main body 2, and the designation content may be stored as a preset. Then, viscosity control in accordance with this preset may be performed constantly or in an appropriate scene. In FIG. 15, under the assumption that the above preset setting has been finished, first, (C1) the system software sends the above stored preset number to the controller control section 41. Next, (C2) the controller control section 41 calculates the position and the displacement speed of the analog stick 42 on the basis of voltage values from the analog stick 42 at this time. Next, (C3) the controller control section 41 generates a viscosity parameter on the basis of the preset number and the calculated position and displacement speed of the analog stick 42. Then, the controller control section 41 outputs a voltage command value based on the viscosity parameter to the MRF unit. Thus, the viscosity for the analog stick 42 can be controlled irrespective of the application.

In the above control examples, the position and the like of the analog stick 42 are used. However, in another exemplary embodiment, control not using the position and the like may be performed. For example, control may be performed such that a predetermined viscosity is imparted uniformly over the entire movable range of the analog stick 42, without using the position of the analog stick 42 (information indicating the position). That is, control may be performed such that a predetermined viscosity is imparted constantly.

[Case of Performing Control by System]

Figure 16:
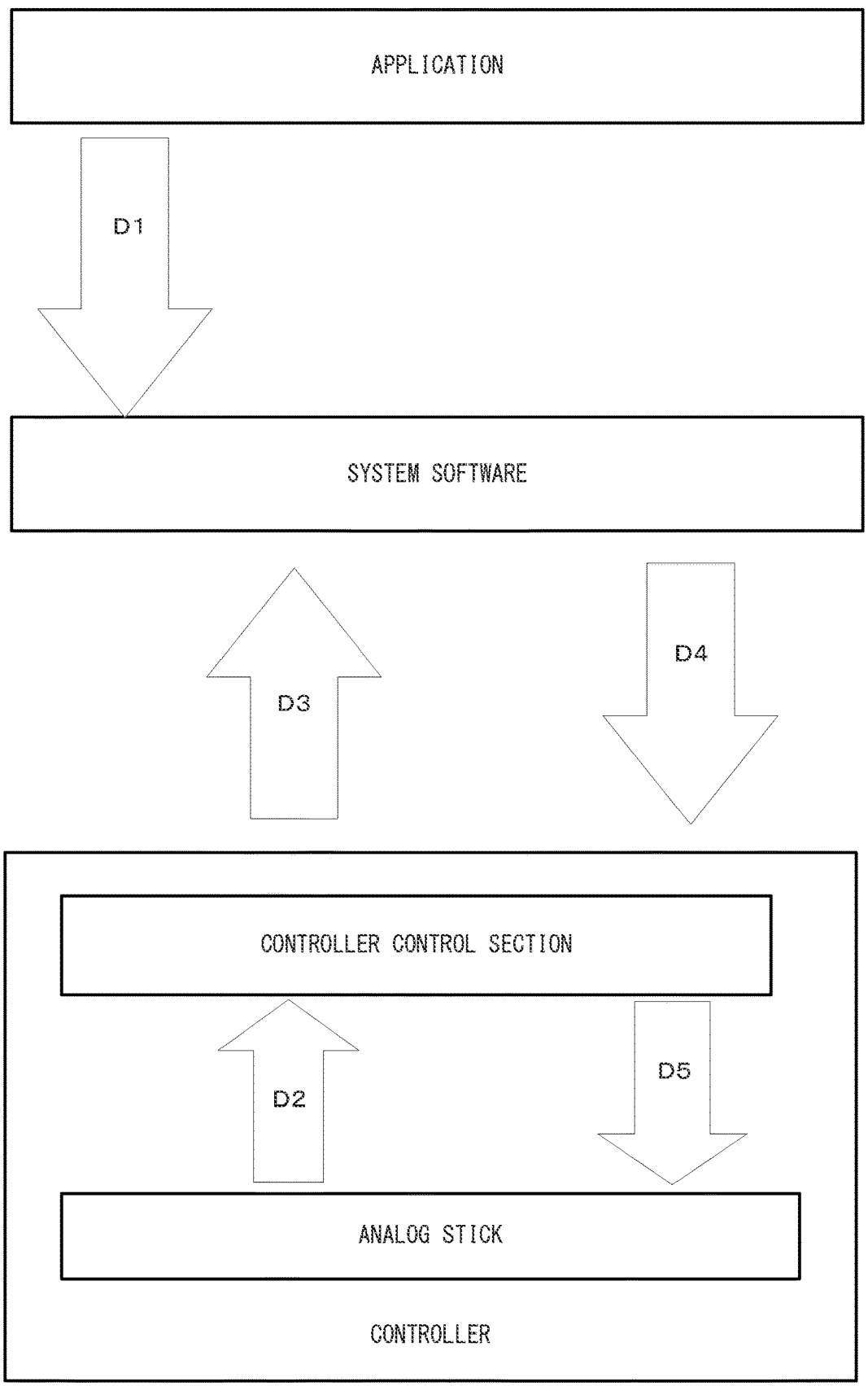
FIG. 16 illustrates a non-limiting example of a control pattern D.

Next, a case of performing control mainly by the system software (hereinafter, referred to as control pattern D) will be described. As described above, in the exemplary embodiment, the preset library is stored in the controller control section 41, and in general, the storage capacity of the memory provided to the controller control section 41 is limited to a certain extent. Thus, the patterns of viscosity controls stored in the preset library might be limited to a certain extent. Therefore, while ensuring response to a certain extent, in order to allow more expressions than in the preset library as feeling expressions by viscosity control, a pattern of performing control by the system software is also available. Flow of control in this case is, for example, as shown in FIG. 16. First, (D1) the application sends the above-described movable area information to the system software. (D2) The controller control section 41 receives voltage values from the analog stick 42. (D3) Further, on the basis of the voltage values, the controller control section 41 calculates the position and the displacement speed of the analog stick 42, and sends them to the system software. (D4) The system software generates the viscosity parameter on the basis of the above movable area information and the position and the displacement speed of the analog stick 42, and sends the viscosity parameter to the controller control section 41. (D5) Then, the controller control section 41 outputs a voltage command value based on the viscosity parameter to the MRF unit. In other words, flow from (D2) to (D5) in FIG. 16 forms a loop, and the application sends the movable area information to the loop at any timing.

In the exemplary embodiment, such a plurality of control patterns are available, so that convenience for the application developer can be enhanced. The above control patterns are merely examples, and other control methods may be adopted in accordance with the use case of the application.

[Example of Selective Use of Control Patterns]

As an example of selective use of the above control patterns, a case of selectively using "viscosity control directly in accordance with the position of the analog stick 42" and "viscosity control not directly in accordance with the position of the analog stick 42" will be described. In this case, more appropriate control is used on the basis of whether or not to perform viscosity control directly in accordance with the position of the analog stick 42. For example, such an application that a virtual object can be moved in a virtual space is assumed. In this application, it is possible to perform such control that the viscosity changes in accordance with the location of the virtual object in the virtual space while the virtual object is moved. This control is viscosity control that is not directly in accordance with the position of the analog stick 42. As an example, in such an application that a virtual object can be operated by the analog stick 42, the viscosity of the analog stick 42 may be increased in accordance with the position of the virtual object in a virtual space. In this case, the virtual object can be moved on the basis of the position of the analog stick 42, but this is not a case where the viscosity is controlled directly on the basis of the position of the analog stick 42. After all, the viscosity is controlled directly on the basis of the "position of the virtual object in the virtual space", in other words, the execution state of the application. Therefore, in such a case, control of outputting the viscosity parameter is performed mainly at the application side. As a method for acquiring and outputting the viscosity parameter, the viscosity parameter may be generated in a code of the application, or presets of viscosity parameters may be provided as a library in the application. In the latter case, for example, presets corresponding to terrains in a virtual space may be prepared, and a predetermined preset may be designated on the basis of the position of a virtual object. In this way, in a case where the application side performs a main role of preparing and outputting the viscosity parameter, it is possible to increase varieties of expressions of feelings to be given to the user.

On the other hand, in a predetermined scene in the application (e.g., a scene other than a scene in which a virtual object is moved), if viscosity control is to be performed directly in accordance with the position of the analog stick 42, the controller control section 41 can perform a main role of performing viscosity control.

Hereinafter, various control examples based on the above configurations and control patterns will be described.

First Example

First, a first example of the exemplary embodiment will be described. This example is an example of control mainly aiming at achieving both "presentation of various feelings" and "restoration to the initial position when no fingers are touching the analog stick".

[Principle of Control in First Example]

First, the principle of control in the first example will be described. In general, an operation feeling for the analog stick 42 likely to be desired by the user is such an operation feeling that the position of the analog stick 42 returns to the initial position (initial state) when the hand or the fingers are taken off the analog stick 42. In this regard, in a case where the above-described MRF is used for the analog stick 42, it is possible to present various feelings to the user by increasing the viscosity of the MRF. Meanwhile, in a state in which the viscosity is high to a certain extent, even if the hand or the fingers are taken off the analog stick 42, the MRF serves as a brake, so that the analog stick 42 might remain tilted without returning to the initial position or might move very slowly though returning. Therefore, it might be impossible to provide an operation feeling that the user will desire for the analog stick 42. In this regard, as a solution, reducing a resistance force of the MRF or increasing the restoring force thereof is conceivable. However, if the resistance force is reduced, user experiences and expressions in applications that can be realized by the resistance force are constrained. Accordingly, in the first example, control of current to be applied to the MRF is performed in the way as described below, thus achieving both presentation of a feeling using the MRF and an initial position restoration operation.

Figure 17:
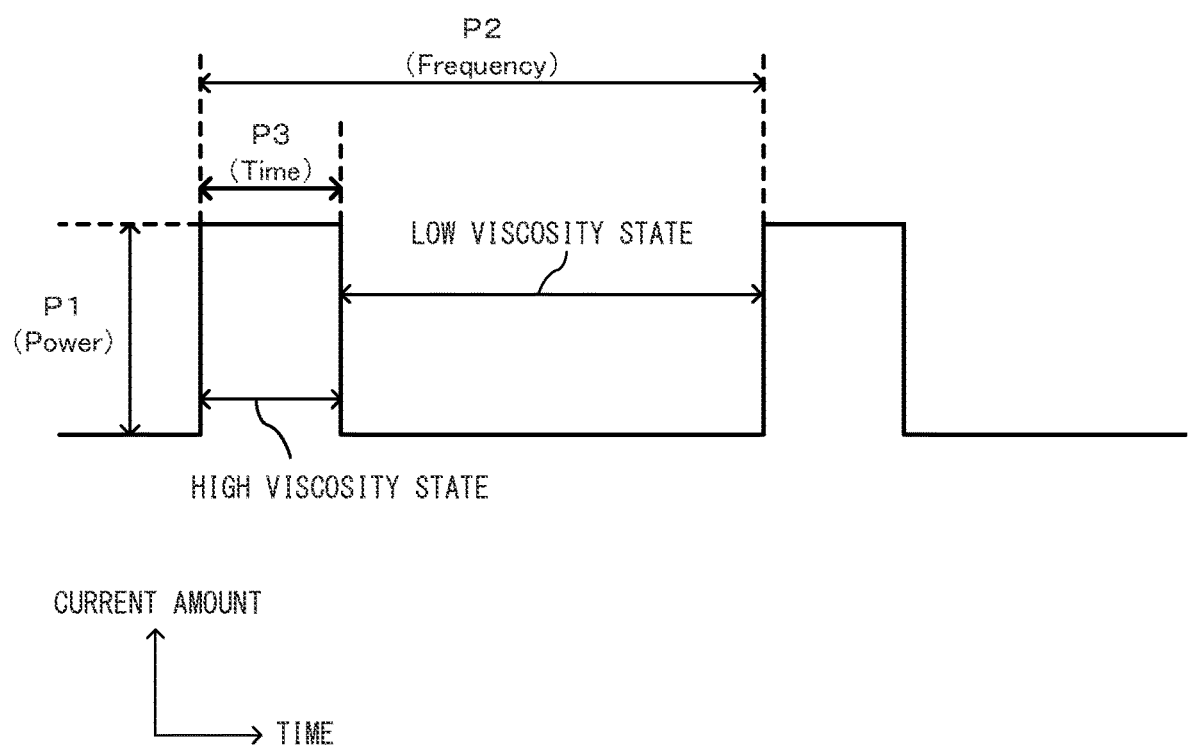
FIG. 17 illustrates a non-limiting example of the principle of control in a first example.

FIG. 17 is a timing chart illustrating control in the first example. In FIG. 17, the vertical axis indicates the amplitude (current amount) and the horizontal axis indicates time. In FIG. 17, P1 denotes the amplitude and P2 denotes the cycle (frequency). In addition, P3 denotes a time during which current is caused to flow in one cycle (i.e., a time during which voltage is applied; hereinafter, referred to as application time). In the exemplary embodiment, the cycle P2 and the application time P3 can be controlled in a unit of 1 millisecond. In addition, the amplitude P1, the cycle P2, and the application time P3 correspond to the "viscosity parameter" described above. Regarding the application time P3, control may be performed by designating the duty cycle (Duty), instead of designating a time. That is, the duty cycle may be controlled as a parameter so that the application time is controlled consequently. This can also be said to be control of the application time. The same applies to the other parameters, that is, as long as a target parameter is controlled consequently, a specific method therefor and a parameter used for the calculation may be adopted as appropriate.

Here, the value of the amplitude P1 is such a value that the viscosity of the MRF becomes greater than the restoring force by the restoring force imparting section. That is, this value is such a value that the analog stick 42 remains tilted even when the fingers are taken off. Then, in the first example, control is performed such that, in a certain cycle, first, current having a magnitude indicated by P1 is caused to flow during a period indicated by the application time P3, and thereafter, no current is caused to flow. As a result, during the period indicated by the application time P3, the viscosity of the MRF is in such a state that the analog stick 42 is not autonomously restored to the initial position even if the fingers are taken off (hereinafter, referred to as a high viscosity state). As used herein, "not being restored to the initial position" basically refers to such a state that the analog stick 42 does not move even if the fingers are taken off the analog stick 42. However, without limitation thereto, in another exemplary embodiment, the high viscosity state may be such a state that the analog stick 42 autonomously moves toward the initial position but the movement speed thereof is very slow. For example, in a case of not being in the high viscosity state, the analog stick 42 is restored to the initial position in less than 1 second after the fingers are taken off, whereas in the high viscosity state, it takes 5 seconds or 10 seconds for the analog stick 42 to be restored to the initial position because the movement speed is slow.

On the other hand, in a period other than P3, since voltage is not applied (current is not caused to flow), the viscosity of the MRF is reduced so that the restoring force becomes greater than the resistance force by the viscosity of the MRF, thus making such a state that the analog stick can be autonomously restored to the initial position (hereinafter, this state is referred to as low viscosity state). As described above, in the first example, the high viscosity state and the low viscosity state are provided in one cycle, thereby preparing a period for the analog stick 42 to be restored to the initial position. Through repetition of such cycles, the viscosity periodically changes alternately between the high viscosity state and the low viscosity state. As a result, a period for the analog stick 42 to be restored to the initial position is produced as a short period, and the analog stick 42 can be restored to the initial position during this period. In this way, while presentation of a feeling using the high viscosity state is achieved, autonomous initial position restoration can be performed at a timing when the low viscosity state period comes, and thus both of such operation feelings are achieved without giving a strange feeling to the user.

Here, if the period of the low viscosity state is extremely short, a restoration operation of the analog stick 42 to the initial position might not be started substantially. Therefore, in the first example, the period of the low viscosity state is set to be not less than such a predetermined period that substantial start of the restoration operation is ensured.

In the above example, a case where voltage is not applied in the low viscosity state, has been shown. However, in another example, voltage at such a level that does not inhibit the initial position restoration operation of the analog stick 42 may be applied in the period of the low viscosity state.

Specific values of the viscosity parameters for realizing the high viscosity state and the low viscosity state may be stored as presets as described above in the controller control section 41. Alternatively, such presets may be provided in the system software, instead of being stored in the controller control section 41. Still alternatively, such presets may be defined at the application side, and may be provided as a part of the application program. In this way, by defining the high viscosity state and the low viscosity state as presets in advance, it becomes possible to easily designate the high viscosity state and the low viscosity state, whereby the burden on the developer can be reduced.

Next, other control examples using the high viscosity state and the low viscosity state will be described.

First, a control example in which a viscosity state is designated from the application and a viscosity parameter is generated accordingly in the system software, will be described. In this example, first, from the application, the amplitude P1 and the cycle P2 are outputted as viscosity information to the system software. In the system software, the application time P3 is calculated on the basis of the amplitude P1 and the cycle P2. In this calculation, the system software calculates the application time P3 such that the amplitude P1 and the cycle P2 are adapted to the high viscosity state and a period for the analog stick 42 to return to the initial position (period of low viscosity state) can be ensured. For example, the system software is configured to have data in which values of the amplitude P1 and the cycle P2, and appropriate values of the application time P3 corresponding thereto, are associated with each other. Then, when having received the viscosity information from the application, the system software determines an appropriate application time P3 by referring to the data. Alternatively, the application time P3 may be determined through calculation using a predetermined algorithm. Then, the system software outputs the determined application time P3, and the amplitude P1 and the cycle P2 received from the application, to the controller control section 41, as the viscosity parameter. Such control can reduce the data size and the storage amount as compared to a case of storing all three components constituting the viscosity parameter as a preset.

Next, as another control example, control in which the viscosity of the MRF is adjusted (viscosity parameter is corrected) in accordance with the restoring force by the restoring force imparting section, will be described. This is for considering difference in the restoring force due to individual variations of the controller 4. Specifically, in this control, a restoring force parameter indicating the strength, performance, and the like of the restoring force is acquired by a predetermined method. Then, the content of the viscosity parameter is corrected in accordance with the restoring force parameter. In a case of performing such control, first, the restoring force parameter needs to be acquired. The restoring force parameter may be acquired by the following methods. First, it is conceivable that a sensor for directly measuring the restoring force is provided to the controller 4 or the like. As another method, for example, the user may be made to perform an operation of tilting the analog stick 42 to a movable limit position, e.g., fully to the right end, and then taking off the fingers, and a restoration time until the analog stick 42 returns to the initial position may be measured. In this case, the restoration time may be directly used as the restoring force parameter, or the restoring force parameter may be separately calculated on the basis of the restoration time.

In the exemplary embodiment, the case of having an elastic body such as a coil spring as the restoring force imparting section is shown as an example, and therefore torque of the coil spring according to the position of the analog stick 42 may be used as the restoring force parameter. That is, torque of the coil spring according to the present position of the analog stick 42 may be calculated by a predetermined method, and using the torque as the restoring force parameter, the content of the viscosity parameter may be corrected.

Control may be performed using the position of the analog stick 42, instead of using the restoring force parameter. That is, the content of the viscosity parameter for realizing the high viscosity state or the low viscosity state may be adjusted in accordance with the position of the analog stick 42. In addition, the period of the high viscosity state or the low viscosity state may be controlled so as to be changed in accordance with the position of the analog stick 42.

Next, as another control example, when the restoring force is small, at least one of the following controls may be performed as compared to when the restoring force is great.
(1) Control of reducing the viscosity in the high viscosity state
(2) Control of shortening the period of the high viscosity state
(3) Control of reducing the viscosity in the low viscosity state (under the assumption that a certain level of voltage is applied even in the low viscosity state)
(4) Control of prolonging the period of the low viscosity state Any of the above controls is for making it easier to return to the initial position when the restoring force is small. For example, such control of reducing the viscosity in the high viscosity state as the restoring force becomes smaller, is conceivable.

As still another control example, if the restoring force indicated by the restoring force parameter is smaller than a predetermined reference value, it may be determined that the restoring force is small, and control may be performed to make it easier to return to the initial position.

Next, a specific example of correction for the restoring force parameter will be described. In the first example, for example, first, the viscosity parameter is sent from the application or the system software to the controller control section 41. Next, for the viscosity parameter, the controller control section 41 corrects the amplitude P1 and/or the application time P3 in accordance with the restoring force parameter. Then, viscosity control is performed using the corrected viscosity parameter. Through such correction, adjustment of the viscosity of the MRF in accordance with the restoring force is performed. Here, regarding correction for the viscosity parameter, it is also possible for the controller control section 41 to perform correction of changing the cycle P2. However, in a case of changing the cycle P2 to change the viscosity, change in a feeling given to the user becomes great, so that a strange feeling might be given on the contrary. Therefore, in this example, with the cycle P2 remaining constant, the amplitude P1 or the application time P3 is changed to adjust the viscosity. It is noted that the cycle remaining "constant" may not necessarily be strictly constant and there may be slight deviations or variation widths in the cycles as long as the cycles can be considered to be substantially constant.

Regarding the content of change of the amplitude P1 or the application time P3, in the first example, specifically, control is performed so that the amplitude P1 is increased and the application time P3 is kept constant or is reduced. This is because, in a case of desiring to increase the viscosity, if control is performed so as to increase only the application time P3, the period of the low viscosity state is shortened and an initial position restoration operation becomes less likely to occur. Therefore, the viscosity is increased by increasing the amplitude P1 instead of the application time P3. In this case, the application time P3 may be not changed (kept constant) or may be reduced so as to ensure a longer period for the low viscosity state.

In the above description, a main component that performs adjustment of the viscosity parameter in accordance with the restoring force is the controller control section 41, as an example. However, in another example, the same processing may be performed at the system software side or the application side.

As described above, in the first example, the viscosity periodically changes alternately between the high viscosity state and the low viscosity state. As a result, a period for the analog stick 42 to be restored to the initial position is produced as a short period, and the analog stick 42 can be restored to the initial position during this period. In this way, regarding operation feelings for the analog stick 42, presentation of a feeling using the high viscosity state and an initial position restoration operation using the low viscosity state are both achieved.

Second Example

Next, the second example will be described. This example is an example of control that mainly considers the relationship between the displacement direction of the analog stick 42 and the restoring force by the restoring force imparting section. Specifically, this is control for making constant a resistance feeling that the user receives at the user's fingers, irrespective of the displacement direction of the analog stick 42.

Figure 18:
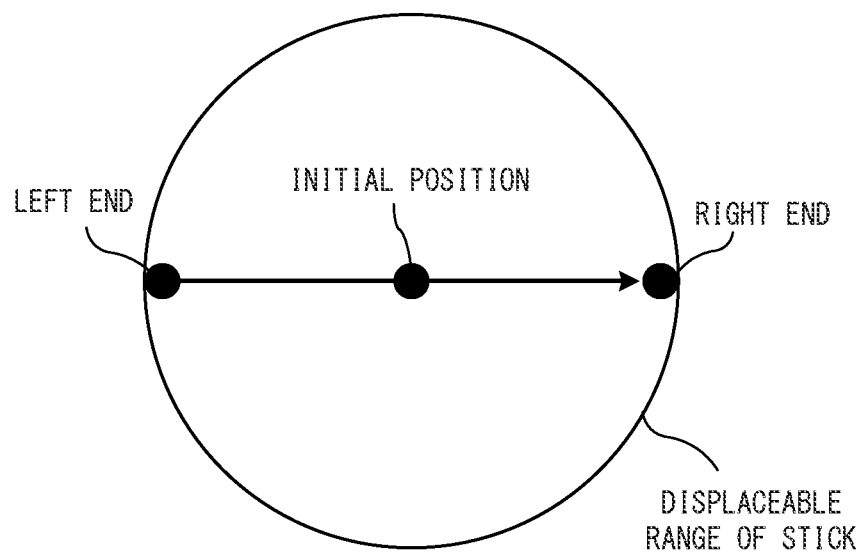
FIG. 18 illustrates a non-limiting example of the principle of control in a second example.
Figure 19:
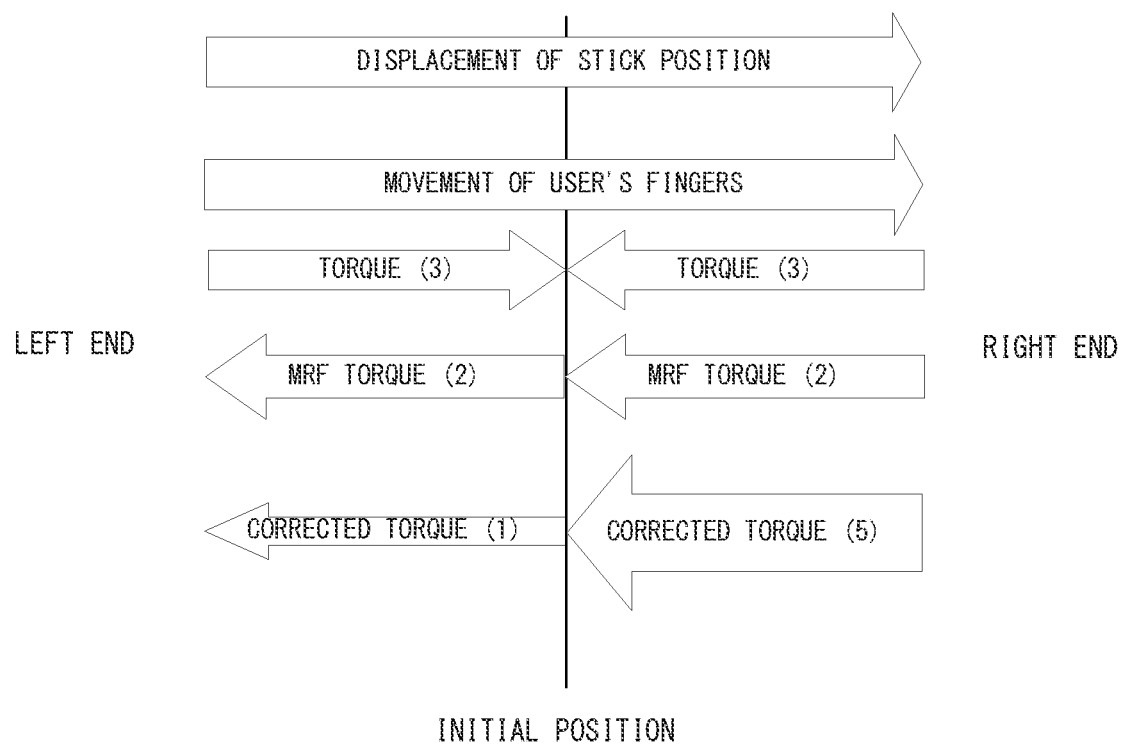
FIG. 19 illustrates a non-limiting example of the principle of control in the second example.
Figure 20:
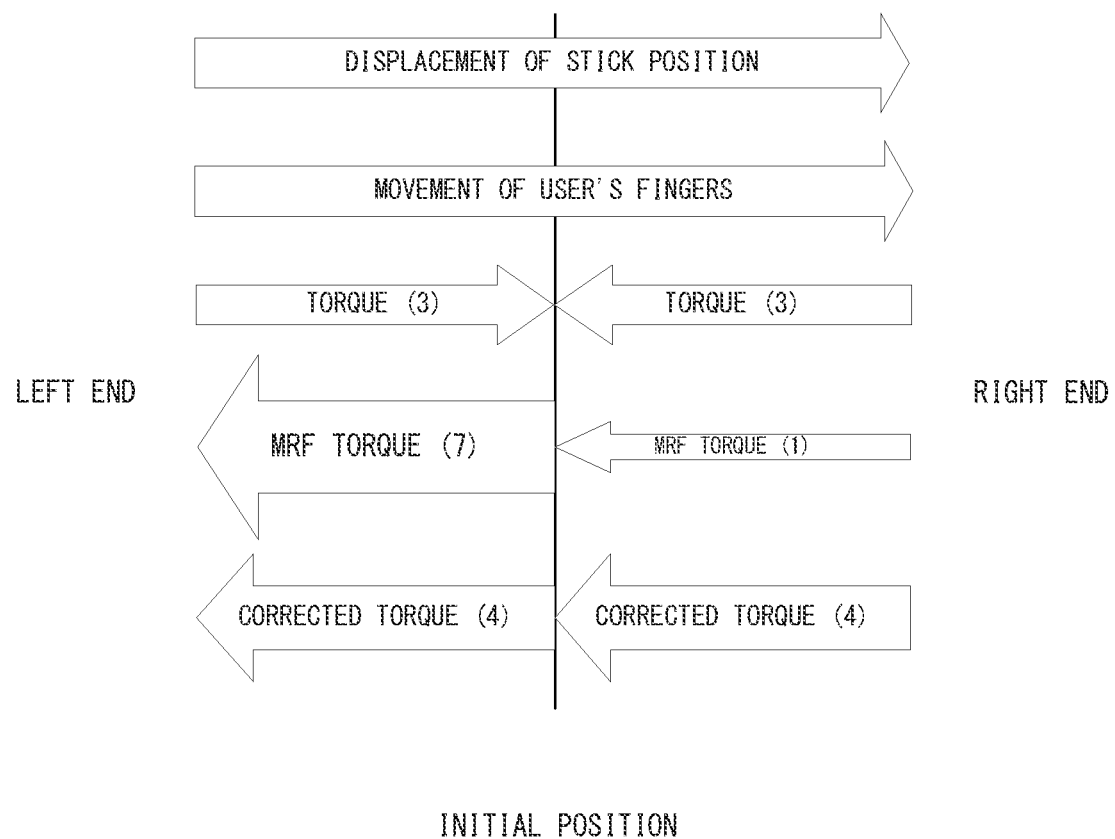
FIG. 20 illustrates a non-limiting example of the principle of control in the second example.

The principle of control in the second example will be described. First, a case where the position of the analog stick 42 is displaced toward the initial position and a case where the position of the analog stick 42 is displaced toward the outer side as seen from the initial position, are assumed, and thus the direction of the restoring force relative to the displacement direction of the stick can be different. Therefore, in order to allow the fingers to feel certain (constant) torque, the viscosity of the MRF needs to be corrected in consideration of the influence of the restoring force by the restoring force imparting section in accordance with the position and the displacement direction of the analog stick 42. As an example, a case of displacing the analog stick 42 through a straight trajectory from the left end to the right end of the movable range thereof, is assumed. FIG. 18 schematically shows the trajectory in the case of displacing the analog stick 42 from the left end to the right end in the movable range. FIG. 19 schematically shows what torque is obtained after correction in a case of not performing control in the exemplary embodiment as described later. FIG. 20 schematically shows what torque is obtained after correction in a case of performing the control in the exemplary embodiment.

Here, in FIG. 19 and FIG. 20, "displacement of the stick position" indicates displacement of the position of the analog stick, and "movement of the user's fingers" indicates actual movement of the user's fingers. In FIG. 19 and FIG. 20, displacement of the stick position and movement of the user's fingers are both directed in the same direction. "Torque" is shown as an example of the restoring force, and has a constant value depending on the spring or the like as described above, for example. "MRF torque" indicates the resistance force by the MRF. "Corrected torque" indicates a value obtained by correcting the above "torque" by the above "MRF torque". Numerical values in parentheses in arrows in FIG. 19 are the "values" of the respective torques exemplified for the purpose of facilitating understanding (the same applies to FIG. 20). In FIG. 19, as the value of the torque, the same value is used between a case where the analog stick moves from the left end to the initial position and a case where the analog stick moves from the initial position to the right end, but this value is merely an example. In actual user's operation, another variable and another element may intervene, and therefore the torque may have different values.

First, the case of FIG. 19 will be described. As shown in FIG. 19, the displacement direction of the analog stick 42 (and the user's fingers) is rightward. Therefore, the MRF torque is basically a leftward resistance force. Under this situation, first, during movement from the left end to the initial position, the torque is a rightward force, and during movement from the initial position to the right end, the torque is a leftward movement. Here, it is assumed that the viscosity of the MRF is not changed (kept constant) during the period in which the position of the analog stick 42 moves from the left end to the right end. In this case, if a correction value by the MRF torque is not adjusted, the value of the corrected torque might greatly differ. In the example of FIG. 19, without the adjustment, during movement from the left end to the initial position, the torque that is a rightward force of "3" is canceled out by the MRF torque that is a leftward force of "2", so that the corrected torque becomes a leftward force of "1". On the other hand, during movement from the initial position to the right end, the torque is a leftward force of "3", and the MRF torque that is a force of "2" having the same leftward direction is added thereto, so that the corrected torque becomes a force of "5" having the same leftward direction. That is, across the boundary at the initial position, the force greatly changes (though the direction does not change).

Accordingly, in the second example, as shown in FIG. 20, in a case where the displacement direction of the analog stick 42 is a direction of approaching the initial position, the viscosity is controlled to be greater than in a case where the displacement direction of the analog stick 42 is a direction away from the initial position. That is, the viscosity of the MRF is controlled so as to satisfy a relationship of "the viscosity during displacement toward the initial position>the viscosity during displacement away from the initial position". In the example of FIG. 20, the value of the MRF torque in the former case is "7", and the value in the latter case is "1". Thus, the corrected torque becomes a force of "4" in both the case of approaching the initial position and the case of moving away from the initial position, so that the corrected torque can be prevented from greatly differing. Through such control, the corrected torque can be made (almost) constant irrespective of the displacement direction of the analog stick 42. In the example of FIG. 20, in a case where the analog stick 42 is straightly displaced from the left end to the right end, it is possible to present almost constant torque as torque felt by the user's fingers during this period.

Here, the analog stick 42 used in the second example is configured to have the MRF units individually for the X axis and the Y axis. Therefore, it is possible to perform viscosity control individually on the X axis and the Y axis, to produce certain torque. Meanwhile, the torque (viscosity) of the analog stick 42 is basically presented as a sum of viscosities on the X axis and the Y axis, to the user. At this time, if the torques calculated on the respective axes are directly used and summed, the resultant torque might be too strong. Therefore, in the second example, in a case of producing certain torque, torque in each direction of the X axis and the Y axis is calculated in consideration of the movement direction of the analog stick 42. For example, a case where the analog stick 42 is moving in an obliquely upper right direction at 45 degrees, is assumed. Then, where a target force (of torque) is denoted by f and the movement direction is denoted by θ, torque x on the X axis is calculated as "x=f cos θ", and torque y on the Y axis is calculated as "y=f sin θ". As a result, in this case, a force (of torque) obtained by multiplying the target force (of torque) by $1/\sqrt{2}$ is outputted on each of the X axis and the Y axis. Through such control, it becomes possible to produce more appropriate torque. Here, such control is established because a configuration in which torques are calculated individually for the X axis and the Y axis is adopted. In another example, if, for example, there is only one MRF unit (or only one element corresponding thereto), the above control is not always needed.

Figure 21:
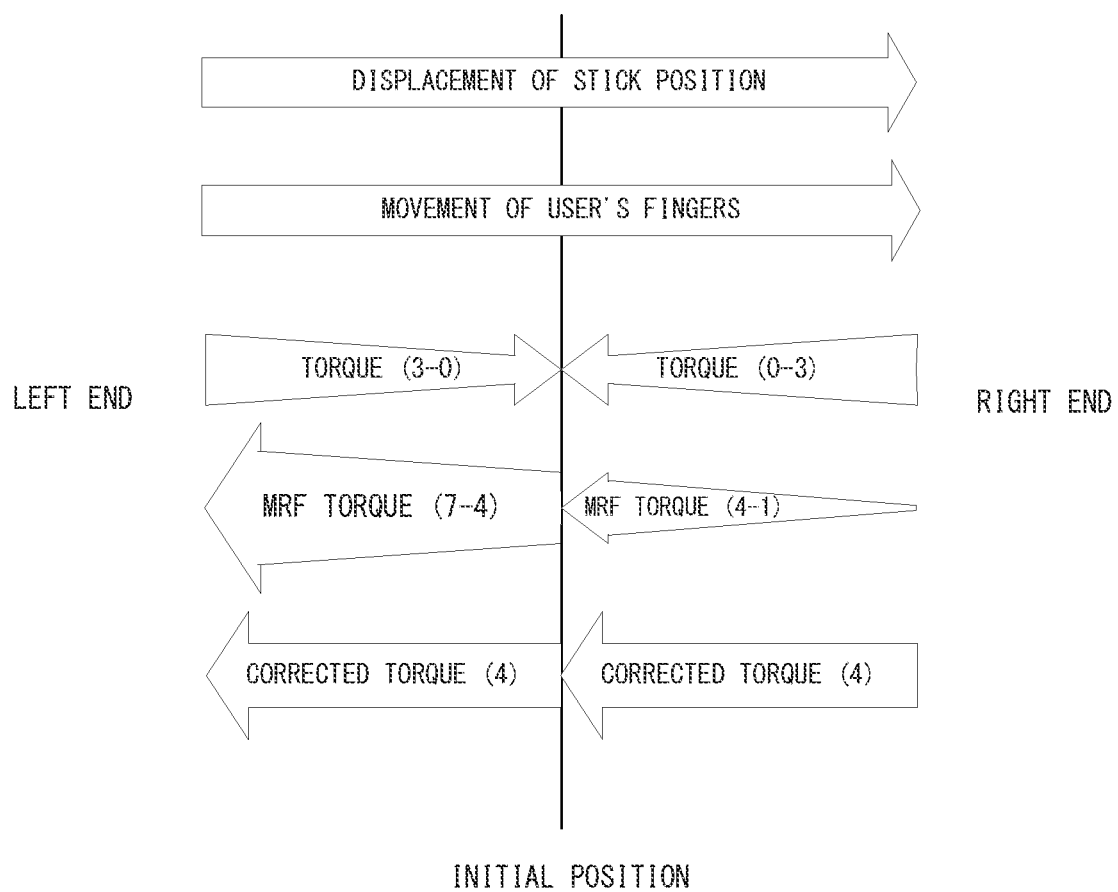
FIG. 21 illustrates a non-limiting example of the principle of control in the second example.

In the second example, in addition to the control focusing on the movement direction, control based on the following aspect is also performed. In a case where the restoring force imparting section is an elastic body, it is considered that the restoring force thereof becomes greater at a position farther from the initial position, and becomes smaller at a position closer to the initial position. Therefore, in the second example, in addition to the above control, control is performed so that the viscosity of the MRF becomes greater when the distance from the initial position is far than when the distance is close. In consideration of the distance from the initial position as described above, the magnitude of the viscosity of the MRF is represented by the thicknesses of arrows of the MRF torque in FIG. 21. In FIG. 21, torque becomes greater at a position farther from the initial position, and becomes smaller at a position closer to the initial position. In addition, in a range between the left end and the initial position, the MRF torque becomes greater at a position farther from the initial position. Conversely, in a range between the initial position and the right end, the MRF torque becomes greater at a position closer to the initial position. Then, by correcting the torque by a value according to the magnitude of the MRF torque which changes in accordance with the position of the analog stick 42, corrected torque is calculated so as to be constant.

Regarding a detection method for the displacement direction, for example, software means may be used such that the controller control section 41 calculates the displacement direction by comparing the present position of the analog stick 42 with the previously detected position. Alternatively, hardware means may be used such that a predetermined sensor capable of detecting the displacement direction, e.g., a pressure sensor, is mounted to the controller 4 and the detection result is used.

Regarding correction for the restoring force parameter, in the second example, the amplitude P1 and/or the application time P3 is corrected. That is, as in the first example, with the cycle P2 remaining constant, the amplitude P1 or the application time P3 is changed to adjust the viscosity. This is because, if the cycle P2 is changed to change the viscosity, change in a feeling that the user receives might be extremely great, as described above.

Here, basically, the control shown in the second example is performed mainly by the controller 4. That is, in the control pattern B or C as shown in FIG. 14 or FIG. 15, the controller control section 41 detects the displacement direction of the stick portion 401 ((B3) in FIG. 14 or (C2) in FIG. 15). Then, on the basis of the detected direction, the controller control section 41 performs correction for the viscosity parameter sent from the application or the system software so that a constant feeling is obtained for the torque, thus controlling the viscosity of the MRF ((B4) in FIG. 14 or (C3) in FIG. 15). The reason why control is performed mainly by the controller 4 is that, in a case of performing viscosity control in consideration of the displacement direction as described above, it is considered that higher response is required in view of difference in the processing speed as described above.

As described above, the controller control section 41 stores the preset library. Therefore, at the application side or the system software side, it is possible to perform not only control of directly designating the viscosity parameter but also control of designating the preset number registered in the preset library and sending the present number to the controller control section 41. In this case, the controller control section 41 reads the viscosity parameter corresponding to the designated preset number, from the preset library, and performs correction for the viscosity parameter in accordance with the displacement direction and the restoring force as described above. Then, the viscosity of the MRF is controlled using the corrected viscosity parameter.

As described above, in the second example, control is performed in consideration of the relationship of the displacement direction of the analog stick 42 and the restoring force by the restoring force imparting section. Thus, irrespective of the displacement direction of the analog stick 42, variations in the resistance force that the user feels can be suppressed and torque that the user feels can be made almost constant.

[Modifications]

In the first example, the example in which the MRF is applied to the analog stick 42 capable of detecting direction changes on two axes of the X axis and the Y axis (two dimensions), has been shown. Alternatively, the above configuration is also applicable to a slidable stick capable of detecting direction changes in two dimensions. In another example, the above configuration may be applied to an input device that can detect a direction change on one axis (one dimension), instead of a device that allows inputs on two axes as described above. For example, an element corresponding to the MRF unit as described above may be applied to a dial-type operation element that is rotatable about one predetermined axis. In this case, it is possible to cause an influence on ease of rotation through viscosity change, while achieving restoration to the initial position. Alternatively, the above configuration may be applied to a press-type button such as the digital button section 44 (this can be considered to be movable only in the up-down direction). Still alternatively, the above configuration may be applied to a trigger-type button. In this case, it is possible to cause an influence on ease of pressing of the button (a resistance feeling against pressing) by the viscosity of the MRF.

As another example, the above MRF may be applied to an input device that can detect direction changes on three axes X, Y, Z (three dimensions), and control as shown in the first example may be performed therefor.

In the above first example, it has been assumed that the high viscosity state is such a state that the analog stick 42 substantially is not autonomously restored to the initial position even when the fingers are taken off. In another example, the high viscosity state may be such a state that larger current than in the low viscosity state is applied, irrespective of whether or not the analog stick 42 is autonomously restored to the initial position. For example, while an autonomous initial position restoration operation can be performed in both of the high viscosity state and the low viscosity state, the speed of returning to the initial position may be different therebetween. That is, the initial position restoration speed may be made faster in the low viscosity state than in the high viscosity state.

In the above analog stick 42, the positions of the MRF units shown above are merely an example and the MRF units may be at positions other than the above ones. For example, a configuration in which the stick portion 401 directly contacts with the MRF may be adopted, or the MRF units may be provided at any positions as long as it is possible to cause an influence on ease of movement of the stick portion 401.

Regarding correction for the viscosity parameter described above, the designated viscosity parameter may be allowed to be finally corrected in the system software or the controller control section in accordance with the controller type or preference of the user. For example, control may be performed such that the designated viscosity parameter (one component thereof, e.g., amplitude) is corrected to be multiplied by 1.2. The multiplying factor for correction may be set in advance or calculated on the basis of the controller type. Alternatively, the multiplying factor for correction may be determined on the basis of the content of designation by the user.

In the above first example, the state control for the MRF is performed such that the viscosity periodically changes alternately between two viscosity states, i.e., the high viscosity state and the low viscosity state. This control may be performed using three or more viscosity states. For example, control may be performed such that the viscosity periodically changes in a predetermined order among a state A, a state B, and a state C which respectively correspond to different viscosities.

In the above description, the information processing system in which the information processing apparatus main body 2, the monitor 3, and the controller 4 are configured separately from each other has been shown. Alternatively, the above configuration and control are also applicable to apparatuses such as a hand-held information processing apparatus in which an information processing apparatus main body, a predetermined display section, and an analog stick and/or a button are integrated.

What is claimed is:

1. An information processing system comprising:
   a controller including
      an operation element configured to be displaced from an initial position by a user's operation,
      a restoring force imparting section configured to apply a restoring force for returning a position of the displaced operation element to the initial position,
      a resistance section using a magnetorheological fluid whose viscosity changes in accordance with an intensity of a magnetic field and which serves as a resistance when the operation element is displaced from the initial position and to the initial position, and
      a magnetic field generation section configured to provide the magnetic field to the magnetorheological fluid; and
   a circuit capable of controlling the magnetic field generation section,
   the circuit being configured to control the intensity of the magnetic field generated by the magnetic field generation section so that the viscosity of the magnetorheological fluid periodically changes at least between a first viscosity state and a second viscosity state in which the viscosity is lower than in the first viscosity state and has such a value that the operation element returns to the initial position by the restoring force.

2. The information processing system according to claim 1, wherein
   the circuit performs control so that a period of the second viscosity state is a first predetermined period or longer, in each cycle.

3. The information processing system according to claim 1, wherein
   the circuit performs control so that a period of the second viscosity state is longer than a period of the first viscosity state, in each cycle.

4. The information processing system according to claim 1, wherein
in the first viscosity state, the viscosity has such a value that the operation element does not return to the initial position by the restoring force by the restoring force imparting section.

5. The information processing system according to claim 1, further comprising an information processing apparatus, wherein
the circuit is provided at least in the controller, and controls the intensity of the magnetic field generated by the magnetic field generation section, on the basis of designation from a predetermined application executed in the information processing apparatus.

6. The information processing system according to claim 1, wherein
viscosity information for realizing the first viscosity state and the second viscosity state is stored as a preset in a predetermined storage section in advance, and
in accordance with designation of the preset from a predetermined application executed in the information processing system, the circuit controls the intensity of the magnetic field on the basis of the viscosity information corresponding to the designated preset.

7. The information processing system according to claim 6, wherein
the controller includes a library storage section storing a preset library including at least one said preset, and
the circuit causes the controller to acquire the viscosity information from the preset library on the basis of designation of the preset from the predetermined application executed in the information processing apparatus, and to control the intensity of the magnetic field on the basis of the acquired viscosity information.

8. The information processing system according to claim 7, wherein
the circuit causes the controller to acquire the viscosity information from the preset library on the basis of designation of the preset from the predetermined application and position information indicating a position of the operation element, and to control the intensity of the magnetic field on the basis of the acquired viscosity information.

9. The information processing system according to claim 8, wherein
the circuit acquires information of the position of the operation element and/or a change speed of the position, corrects the viscosity information acquired from the preset library, in accordance with the information, and controls the intensity of the magnetic field on the basis of the corrected viscosity information.

10. The information processing system according to claim 7, wherein
the circuit is provided to the controller.

11. The information processing system according to claim 10, wherein
the circuit continues to control the intensity of the magnetic field on the basis of the viscosity information corresponding to the preset designated last, even when there is no designation from the predetermined application.

12. The information processing system according to claim 7, wherein
the circuit is capable of switching control between first viscosity control which is viscosity control based on an application state but not based on a position of the operation element, and second viscosity control which is viscosity control based on the position of the operation element.

13. The information processing system according to claim 12, wherein
in a case of performing the first viscosity control, the circuit controls the intensity of the magnetic field on the basis of the viscosity information outputted from the predetermined application, and
in a case of performing the second viscosity control, the circuit causes the controller to acquire the viscosity information from the preset library on the basis of designation of the preset from the predetermined application and position information indicating the position of the operation element, and to control the intensity of the magnetic field on the basis of the acquired viscosity information.

14. The information processing system according to claim 1, wherein
the circuit
acquires viscosity designation information outputted from the predetermined application and designating a state of the viscosity of the magnetorheological fluid,
generates viscosity information for realizing the first viscosity state or the second viscosity state, on the basis of the viscosity designation information, and
controls the intensity of the magnetic field on the basis of the generated viscosity information.

15. The information processing system according to claim 1, further comprising restoring force parameter acquisition means configured to acquire a restoring force parameter which is a parameter relevant to the restoring force, wherein
the circuit adjusts viscosity information for realizing the first viscosity state and/or viscosity information for realizing the second viscosity state, in accordance with the acquired restoring force parameter, or controls a period of the first viscosity state and/or a period of the second viscosity state in accordance with the restoring force parameter.

16. The information processing system according to claim 1, wherein
the circuit executes at least one of
control of making the viscosity in the first viscosity state lower when the restoring force is small than when the restoring force is great,
control of making a period of the first viscosity state shorter when the restoring force is small than when the restoring force is great,
control of making the viscosity in the second viscosity state lower when the restoring force is small than when the restoring force is great, and
control of making a period of the second viscosity state longer when the restoring force is small than when the restoring force is great.

17. The information processing system according to claim 1, wherein
the restoring force by the restoring force imparting section is such that, as displacement of the operation element becomes greater, the restoring force for returning to the initial position becomes greater,
the information processing system further includes an operation position acquisition section configured to acquire a position of the operation element, and
in accordance with the position of the operation element acquired by the operation position acquisition section, the circuit adjusts viscosity information for realizing the first viscosity state and/or viscosity information for realizing the second viscosity state or controls a period of the first viscosity state and/or a period of the second viscosity state.

18. The information processing system according to claim 1, wherein
among an amplitude, a frequency, and an application time of current to be applied to the magnetic field generation section, the circuit changes the amplitude and/or the application time without changing the frequency, to change the viscosity of the magnetorheological fluid into the first viscosity state or second viscosity state.

19. The information processing system according to claim 1, wherein
the first viscosity state is such a state that the operation element is not autonomously restored to the initial position by the restoring force, or such a state that a speed of restoration of the operation element to the initial position is slower than in the second viscosity state.

20. A controller comprising:
an operation element configured to be displaced from an initial position by a user's operation;
a restoring force imparting section configured to apply a restoring force for returning a position of the displaced operation element to the initial position;
a resistance section using a magnetorheological fluid whose viscosity changes in accordance with an intensity of a magnetic field and which serves as a resistance when the operation element is displaced from the initial position and to the initial position;
a magnetic field generation section configured to provide the magnetic field to the magnetorheological fluid; and
a circuit capable of controlling the magnetic field generation section,
the circuit being configured to control the intensity of the magnetic field generated by the magnetic field generation section so that the viscosity of the magnetorheological fluid periodically changes at least between a first viscosity state and a second viscosity state in which the viscosity is lower than in the first viscosity state and has such a value that the operation element returns to the initial position by the restoring force.

21. An information processing method for controlling an information processing system comprising:
a controller including
an operation element configured to be displaced from an initial position by a user's operation,
a restoring force imparting section configured to apply a restoring force for returning a position of the displaced operation element to the initial position,
a resistance section using a magnetorheological fluid whose viscosity changes in accordance with an intensity of a magnetic field and which serves as a resistance when the operation element is displaced from the initial position and to the initial position, and
a magnetic field generation section configured to provide the magnetic field to the magnetorheological fluid; and
a circuit capable of controlling the magnetic field generation section,
the information processing method causing the circuit to control the intensity of the magnetic field generated by the magnetic field generation section so that the viscosity of the magnetorheological fluid periodically changes at least between a first viscosity state and a second viscosity state in which the viscosity is lower than in the first viscosity state and has such a value that the operation element returns to the initial position by the restoring force.

22. A computer-readable non-transitory storage medium having stored therein an information processing program to be executed by a computer of an information processing system comprising:
a controller including
an operation element configured to be displaced from an initial position by a user's operation,
a restoring force imparting section configured to apply a restoring force for returning a position of the displaced operation element to the initial position,
a resistance section using a magnetorheological fluid whose viscosity changes in accordance with an intensity of a magnetic field and which serves as a resistance when the operation element is displaced from the initial position and to the initial position, and
a magnetic field generation section configured to provide the magnetic field to the magnetorheological fluid; and
a circuit capable of controlling the magnetic field generation section,
the information processing program causing the computer to control the intensity of the magnetic field generated by the magnetic field generation section so that the viscosity of the magnetorheological fluid periodically changes at least between a first viscosity state and a second viscosity state in which the viscosity is lower than in the first viscosity state and has such a value that the operation element returns to the initial position by the restoring force.

* * * * *